US012583287B2

(12) United States Patent
Mou et al.

(10) Patent No.: US 12,583,287 B2
(45) **Date of Patent: \*Mar. 24, 2026**

(54) METHOD OF NOTIFYING IN-CAR AIR POLLUTION

(71) Applicant: Microjet Technology Co., Ltd.,
Hsinchu (TW)

(72) Inventors: Hao-Jan Mou, Hsinchu (TW);
Chin-Chuan Wu, Hsinchu (TW);
Yung-Lung Han, Hsinchu (TW);
Chi-Feng Huang, Hsinchu (TW);
Tsung-I Lin, Hsinchu (TW); Chin-Wen Hsieh, Hsinchu (TW)

(73) Assignee: MICROJET TECHNOLOGY CO., LTD., Hsinchu (TW)

( \* ) Notice: Subject to any disclaimer, the term of this patent is extended or adjusted under 35 U.S.C. 154(b) by 464 days.

This patent is subject to a terminal disclaimer.

(21) Appl. No.: 17/669,598

(22) Filed: Feb. 11, 2022

(65) Prior Publication Data

US 2023/0191876 A1     Jun. 22, 2023

(30) Foreign Application Priority Data

Dec. 20, 2021    (TW) ................................. 110147768

(51) Int. Cl.
*B60H 1/00* (2006.01)
*B60H 3/06* (2006.01)
(52) U.S. Cl.
CPC ......... *B60H 1/00985* (2013.01); *B60H 1/008* (2013.01); *B60H 3/06* (2013.01)
(58) Field of Classification Search
CPC ....... B60H 1/00985; B60H 1/008; B60H 3/06
See application file for complete search history.

(56) References Cited

U.S. PATENT DOCUMENTS

| 9,676,250 B2 | 6/2017 | Weast et al. | |
| 11,648,818 B2 * | 5/2023 | Hasegawa .............. | B60H 1/008 |
| | | | 454/75 |
| 2015/0032266 A1 * | 1/2015 | Weast ................ | B60H 1/00842 |
| | | | 700/276 |

(Continued)

FOREIGN PATENT DOCUMENTS

| CN | 104760490 A | 7/2015 |
| CN | 107244215 A | 10/2017 |

(Continued)

OTHER PUBLICATIONS

Extended European Search Report for European Application No. 22158460.0, dated Jul. 18, 2022.

*Primary Examiner* — Helal A Algahaim
*Assistant Examiner* — Karen Lynelle Furgason
(74) *Attorney, Agent, or Firm* — Birch, Stewart, Kolasch & Birch, LLP

(57) ABSTRACT

A method of notifying in-car air pollution is disclosed and includes: a) providing an in-car air pollution detection system including at least one in-car gas detection module, at least one out-car gas detection module, an in-car air conditioner including an audio element and a display element, and a plurality of filtering and purification components disposed in the interior space of the car for filtering and purifying the air pollution source in the interior space of the car; b) notifying an initial value of the in-car gas detection datum; c) notifying a post-purification value of the in-car gas detection datum, wherein the post-purification value of the in-car gas detection datum is broadcasted by the audio element and/or displayed by the display element of the in-car air conditioner; and d) intelligently selecting an external gas to be introduced or not to be introduced into the interior space of the car.

29 Claims, 26 Drawing Sheets

(56) References Cited

U.S. PATENT DOCUMENTS

| | | | | |
|---|---|---|---|---|
| 2015/0309582 A1* | 10/2015 | Gupta | .................. | G06F 3/0484 |
| | | | | 345/156 |
| 2015/0360544 A1 | 12/2015 | Frueshsorger et al. | | |
| 2016/0176261 A1* | 6/2016 | Khorana | ............ | B60H 1/00821 |
| | | | | 62/126 |
| 2016/0280160 A1* | 9/2016 | MacNeille | ......... | G01C 21/3461 |
| 2016/0288043 A1* | 10/2016 | Meirav | .................. | B01D 53/50 |
| 2017/0275472 A1* | 9/2017 | Yeung | .................... | A01N 65/22 |
| 2017/0284906 A1* | 10/2017 | Xing | ...................... | G01N 15/06 |
| 2018/0281566 A1 | 10/2018 | Kwon et al. | | |
| 2019/0023099 A1* | 1/2019 | Li | ........................... | B60H 1/008 |
| 2020/0101980 A1 | 4/2020 | Adams et al. | | |
| 2020/0247219 A1* | 8/2020 | Kleinow | ............. | B60H 3/0085 |
| 2020/0292438 A1 | 9/2020 | Mou et al. | | |
| 2020/0322470 A1* | 10/2020 | Sim | .................... | G01N 33/0036 |
| 2021/0188050 A1 | 6/2021 | Mou et al. | | |
| 2021/0358242 A1* | 11/2021 | Kim | .......................... | A61L 2/24 |

FOREIGN PATENT DOCUMENTS

| | | | |
|---|---|---|---|
| CN | 107825933 | A | 3/2018 |
| CN | 108263176 | A | 7/2018 |
| CN | 108688444 | A | 10/2018 |
| EP | 4 015 266 | A2 | 6/2022 |
| JP | 8-230454 | A | 9/1996 |
| JP | 2000-177379 | A | 6/2000 |
| JP | 2002-370522 | A | 12/2002 |
| JP | 2004-256092 | A | 9/2004 |
| JP | 2005-177739 | A | 7/2005 |
| JP | 2010-235041 | A | 10/2010 |
| JP | 2016-137818 | A | 8/2016 |
| KR | 10-2009-0053028 | A | 5/2009 |
| KR | 10-2015-0096845 | A | 8/2015 |
| KR | 10-2019-0070789 | A | 6/2019 |
| TW | M500886 | U | 5/2015 |
| WO | WO 2020/218747 | A1 | 10/2020 |

* cited by examiner

12

126

1261b

1261

1261a

12

122

122

METHOD OF NOTIFYING IN-CAR AIR POLLUTION

FIELD OF THE INVENTION

The present disclosure relates to a method of notifying air pollution, and more particularly to a method of notifying in-car air pollution.

BACKGROUND OF THE INVENTION

With the growths of global population and rapid development industry, the air quality is deteriorating gradually. It is not only harmful to human health but also life-threatening in severe cases for people to expose in the harmful air pollution gases for a long time.

There are many pollutants in the air, such as carbon dioxide, carbon monoxide, formaldehyde, bacteria, fungi, volatile organic compound (VOC), particulate matter 2.5 ($PM_{2.5}$) or ozone, etc. which may be seriously harmful to the human body as the concentration of pollutants increases. In the case of $PM_{2.5}$, such fine particles might penetrate through the alveoli, enter the blood vessels, and circulate throughout the body along with the blood circulation. As a result, they not only might be harmful to the respiratory tract, but also might lead to cardiovascular disease and/or increases the risk of cancer.

It is an important research and development topic of the present disclosure to incorporate the detection system into the Internet of Vehicles, so as to detect the air quality, filter the pollution source, and determine if the external air is required to be introduced into the car in real-time in a private car. Moreover, the current air quality in the car can be notify to the driver and/or the passengers through the sound and the video and can be improved on in real-time.

SUMMARY OF THE INVENTION

An object of the present disclosure is to provide a method of notifying in-car air pollution through detecting the current air quality in the interior space of a car, interacting with the filtrating and purification component to filter the pollution source, and determining if the external air is required to be introduced into the car automatically by the artificial intelligence. Moreover, the current air quality in the car can be notify to the driver and/or the passengers through the sound and the video, and can be improved on time.

In accordance with an aspect of the present disclosure, a method of notifying in-car air pollution is provided and includes: a) providing an in-car air pollution detection system including at least one in-car gas detection module for detecting an air pollution source in an interior space of a car and transmitting an in-car gas detection datum, at least one out-car gas detection module for detecting another air pollution source in an exterior space outside the car and transmitting an out-car gas detection datum, an in-car air conditioner including an audio element and a display element, and a plurality of filtering and purification components disposed in the interior space of the car for filtering and purifying the air pollution source in the interior space of the car; b) notifying an initial value of the in-car gas detection datum, wherein when the car is started to drive the in-care air pollution detection system, the initial value of the in-car gas detection datum is detected by at least one in-car gas detection module and transmitted to the in-car air conditioner, and the initial value of the in-car gas detection datum is broadcasted by the audio element and/or displayed by the display element of the in-car air conditioner for notification; c) notifying a post-purification value of the in-car gas detection datum, wherein the in-car gas detection datum is continuously detected and transmitted to the in-car air conditioner by the at least one in-car gas detection module after the air pollution source in the interior space of the car is purified and filtered by the plurality of the filtering and purification components, and the post-purification value of the in-car gas detection datum is transmitted to the in-car air conditioner by at least one the in-car gas detection module and is broadcasted by the audio element and/or displayed by the display element of the in-car air conditioner for notification; and d) intelligently selecting to introduce or not to introduce an external gas into the interior space of the car, wherein the in-car gas detection datum and the out-car gas detection datum are received and compared under the calculation of artificial intelligence by the in-car air conditioner so as to intelligently select and control to introduce or not to introduce the external gas in the exterior space outside the car into the interior space of the car, and the information of introducing or not introducing the external gas into the interior space of the car is broadcasted by the audio element and/or displayed by the display element of the in-car air conditioner for notification.

In accordance with another aspect of the present disclosure, a method of notifying in-car air pollution is provided and includes: a) providing an in-car air pollution detection system including at least one in-car gas detection module for detecting an air pollution source in an interior space of a car and transmitting an in-car gas detection datum, at least one out-car gas detection module for detecting another air pollution source in an exterior space outside the car and transmitting an out-car gas detection datum, an in-car air conditioner including an audio element and a display element, a plurality of filtering and purification components disposed in the interior space of the car for filtering and purifying the air pollution source in the interior space of the car, and a connection device for receiving the in-car gas detection datum and the out-car gas detection datum; b) notifying an initial value of the in-car gas detection datum, wherein when the car is started to drive the in-car air pollution detection system, the initial value of the in-car gas detection datum is detected by at least one in-car gas detection module and transmitted to the connection device, the connection device transmits the initial value of the in-car gas detection datum to the in-car air conditioner, and the initial value of the in-car gas detection datum is broadcasted by the audio element and/or displayed by the display element of the in-car air conditioner for notification; c) notifying a post-purification value of the in-car gas detection datum, wherein the in-car gas detection datum is continuously detected and transmitted to the connection device by the at least one in-car gas detection module after the air pollution source in the interior space of the car is purified and filtered by the plurality of the filtering and purification components, the post-purification value of the in-car gas detection datum is transmitted to the connection device by the at least one in-car gas detection module, the connection device transmits the post-purification value of the in-car gas detection datum to the in-car air conditioner, and the post-purification value of the in-car gas detection datum is broadcasted by the audio element and/or displayed by the display element of the in-car air conditioner for notification; and d) intelligently selecting to introduce or not to introduce an external gas into the interior space of the car, wherein the in-car gas detection datum and the out-car gas detection datum are received and compared under the calculation of artificial intelligence by the connection device, the connection device transmits instructions and controls the in-car air conditioner so as to intelligently select and control to introduce or not to introduce the external gas in the exterior space outside the car into the interior space of the car, and the information of introducing or not introducing the external gas into the interior space of the car is broadcasted by the audio element and/or displayed by the display element of the in-car air conditioner for notification.

In accordance with a further aspect of the present disclosure, a method of notifying in-car air pollution is provided and includes: a) providing an in-car air pollution detection system including at least one in-car gas detection module for detecting an air pollution source in an interior space of a car and transmitting an in-car gas detection datum, at least one out-car gas detection module for detecting another air pollution source in an exterior space outside the car and transmitting an out-car gas detection datum, an in-car air conditioner, a plurality of filtering and purification components disposed in the interior space of the car for filtering and purifying the air pollution source in the interior space of the car, and a connection device for receiving the in-car gas detection datum and the out-car gas detection datum, wherein the connection device includes an audio element and a display element; b) notifying an initial value of the in-car gas detection datum, wherein when the car is started to drive the in-car air pollution detection system, the initial value of the in-car gas detection datum is detected by at least one in-car gas detection module and transmitted to the connection device, and the initial value of the in-car gas detection datum is broadcasted by the audio element and/or displayed by the display element of the connection device for notification; c) notifying a post-purification value of the in-car gas detection datum, wherein the in-car gas detection datum is continuously detected and transmitted to the connection device by the at least one in-car gas detection module after the air pollution source in the interior space of the car is purified and filtered by the plurality of the filtering and purification components, the post-purification value of the in-car gas detection datum is transmitted to the connection device by the at least one in-car gas detection module, and the post-purification value of the in-car gas detection datum is broadcasted by the audio element and/or displayed by the display element of the connection device for notification; and d) intelligently selecting to introduce or not to introduce an external gas into the interior space of the car, wherein the in-car gas detection datum and the out-car gas detection datum are received and compared under the calculation of artificial intelligence by the connection device, the connection device transmits instructions and controls the in-car air conditioner so as to intelligently select and control to introduce or not to introduce the external gas in the exterior space outside the car into the interior space of the car, and the information of introducing or not introducing the external gas into the interior space of the car is broadcasted by the audio element and/or displayed by the display element of the connection device audio element for notification.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1A:
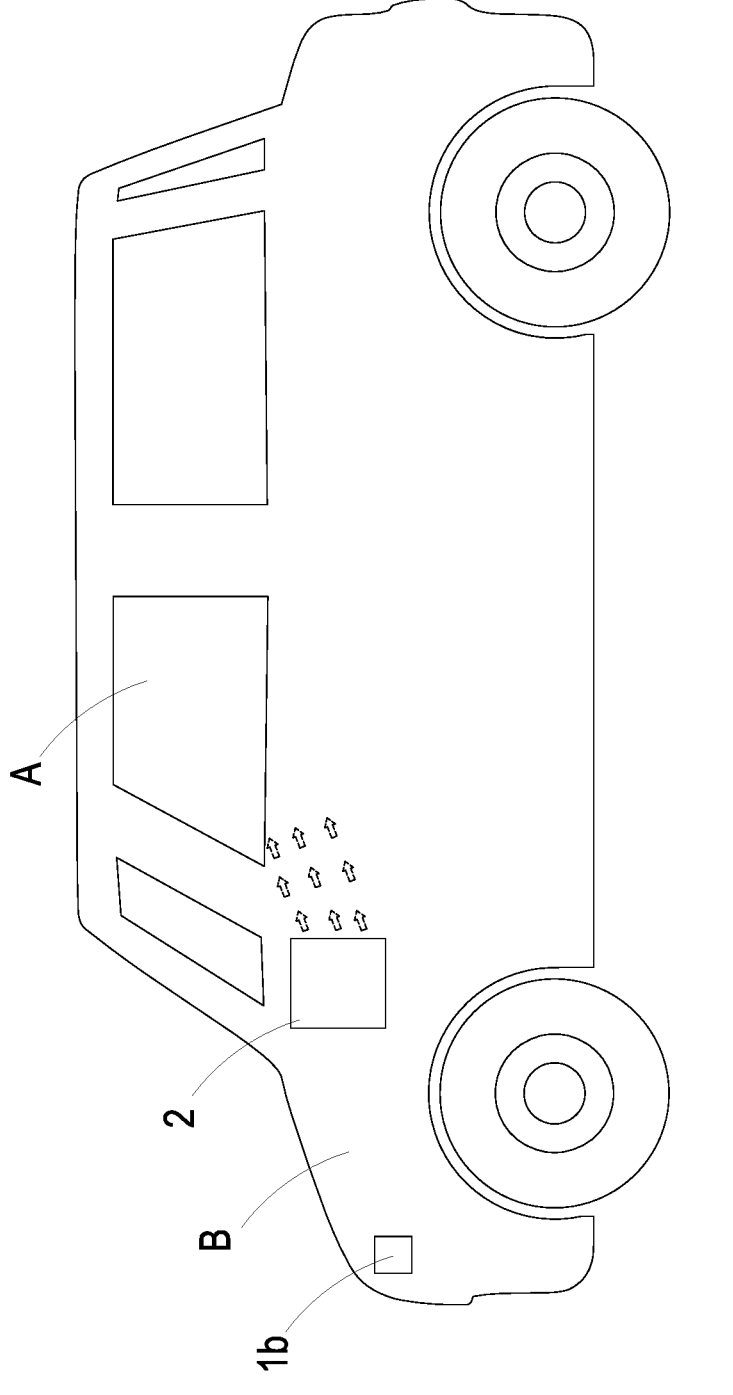
FIG. 1A is an exemplary schematic diagram illustrating an out-car gas detection module and an in-car air conditioner installed in a car for a method of notifying in-car air pollution according to an embodiment of the present disclosure.

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In order to simplify the descriptions of the present disclosure, "the gas detection module 1" mentioned in the present disclosure may refer to "the in-car gas detection module 1a" or "the out-car gas detection module 1b". It can be understood that the in-car gas detection module 1a refers to the gas detection module 1 disposed in the interior space A of the car for detecting the air quality of the interior space A of the car and generating an in-car gas detection datum; and the out-car gas detection module 1b refers to the gas detection module 1 disposed in the exterior space B outside the car for detecting the air quality in the exterior space B outside the car and generating an out-car gas detection datum.

Please refer to FIG. 1A, FIG. 1B, FIG. 1C and FIG. 2A. The present disclosure provides a method of notifying in-car air pollution includes: a) providing an in-car air pollution detection system including at least one in-car gas detection module 1a for detecting an air pollution source in an interior space A of the car and transmitting an in-car gas detection datum, at least one out-car gas detection module 1b for detecting another air pollution source in an exterior space B outside the car and transmitting an out-car gas detection datum, an in-car air conditioner 2 including an audio element V and a display element D, and a plurality of filtering and purification components 3 disposed in the interior space A of the car for filtering and purifying the air pollution source in the interior space A of the car; b) notifying an initial value of the in-car gas detection datum of the interior space A of the car, wherein when the car is started to drive the in-care air pollution detection system, the initial value of the in-car gas detection datum is detected by at least one in-car gas detection module 1a and transmitted to the in-car air conditioner 2, and the initial value of the in-car gas detection datum is broadcasted by the audio element V and/or displayed by the display element D of the in-car air conditioner 2 for notification; c) notifying a post-purification value of the in-car gas detection datum of the interior space A of the car, wherein the in-car gas detection datum is continuously detected and transmitted to the in-car air conditioner 2 by the at least one in-car gas detection module 1a after the air pollution source in the interior space A of the car is purified and filtered by the plurality of the filtering and purification components 3, the post-purification value of the in-car gas detection datum is transmitted to the in-car air conditioner 2 by at least one the in-car gas detection module 1a and is broadcasted by the audio element V and/or displayed by the display element D of in-car air conditioner 2 for notification; and d) intelligently selecting to introduce or not to introduce an external gas into the interior space A of the car, wherein the in-car gas detection datum and the out-car gas detection datum are received and compared under the calculation of artificial intelligence by the in-car air conditioner 2 so as to intelligently select and control to introduce or not to introduce the external gas in the exterior space B outside the car into the interior space A of the car, and the information of introducing or not introducing the external gas into the interior space A of the car is broadcasted by the audio element V and/or displayed by the display element D of the in-car air conditioner 2 for notification.

Notably, the initial value of the in-car gas detection datum can be displayed by the display element D and broadcasted by the audio element V simultaneously in voice or sound effect to notify the initial value of the in-car gas detection datum. Preferably but not exclusively, the post-purification value of the in-car gas detection datum after the air pollution source in the interior space A of the car is purified and filtered by the plurality of the filtering and purification components 3 can be broadcasted simultaneously in voice or sound effect for notification. Preferably but not exclusively, the information of introducing or not introducing the external gas into the interior space A of the car can be displayed and broadcasted simultaneously in voice or sound effect. That is, the display of the display element D and the voice or sound effect of the audio element V may be synchronized, but not limited thereto. Alternatively, merely displaying by a single display element D or broadcasting in voice or sound effect by a single audio element V is also the modification and/or variation of the embodiments of the present disclosure.

Please refer to FIG. 1A, FIG. 1B, FIG. 1C, FIG. 1D and FIG. 2B. The present disclosure provides a method of notifying in-car air pollution includes: a) providing an in-car air pollution detection system including at least one in-car gas detection module 1*a* for detecting an air pollution source in an interior space A of the car and transmitting an in-car gas detection datum, at least one out-car gas detection module 1*b* for detecting another air pollution source in an exterior space B outside the car and transmitting an out-car gas detection datum, an in-car air conditioner 2 including an audio element V and a display element D, a plurality of filtering and purification components 3 disposed in the interior space A of the car for filtering and purifying the air pollution source in the interior space A of the car, and a connection device 4 for receiving the in-car gas detection datum and the out-car gas detection datum; b) notifying an initial value of the in-car gas detection datum of the interior space A of the car, wherein when the car is started to drive the in-car air pollution detection system, the initial value of the in-car gas detection datum is detected by at least one in-car gas detection module 1*a* and transmitted to the connection device 4, the connection device 4 transmits the initial value of the in-car gas detection datum to the in-car air conditioner 2, and the initial value of the in-car gas detection datum is broadcasted by the audio element and/or displayed by the display element of the in-car air conditioner 2 for notification; c) notifying a post-purification value of the in-car gas detection datum of the interior space A of the car, wherein the in-car gas detection datum is continuously detected and transmitted to the connection device 4 by the at least one in-car gas detection module 1*a* after the air pollution source in the interior space A of the car is purified and filtered by the plurality of the filtering and purification components 3, the post-purification value of the in-car gas detection datum is transmitted to the connection device 4 by the at least one in-car gas detection module 1*a*, the connection device 4 transmits the post-purification value of the in-car gas detection datum to the in-car air conditioner 2, and the post-purification value of the in-car gas detection datum is broadcasted by the audio element V and/or displayed by the display element D of the in-car air conditioner 2 for notification; and d) intelligently selecting to introduce or not to introduce an external gas into the interior space A of the car, wherein the in-car gas detection datum and the out-car gas detection datum are received and compared under the calculation of artificial intelligence by the connection device 4, the connection device 4 transmits instructions and controls the in-car air conditioner 2 so as to intelligently select and control to introduce or not to introduce the external gas in the exterior space B outside the car into the interior space A of the car, and the information of introducing or not introducing the external gas into the interior space A of the car is broadcasted by the audio element V and/or displayed by the display element D of the in-car air conditioner 2 for notification.

Notably, the initial value of the in-car gas detection datum can be displayed by the display element D and broadcasted by the audio element V simultaneously in voice or sound effect to notify the initial value of the in-car gas detection datum. Preferably but not exclusively, the post-purification value of the in-car gas detection datum after the air pollution source in the interior space A of the car is purified and filtered by the plurality of the filtering and purification components 3 can be broadcasted simultaneously in voice or sound effect for notification. Preferably but not exclusively, the information of introducing or not introducing the external gas into the interior space A of the car can be displayed and broadcasted simultaneously in voice or sound effect. That is, the display of the display element D and the voice or sound effect of the audio element V can be synchronized, but not limited thereto. Alternatively, merely displaying by a single display element D or broadcasting in voice or sound effect by a single audio element V is also the modification and/or variation of the embodiments of the present disclosure. Notably, in an embodiment, the connection device 4 is a mobile phone device or a wearable device, but not limited thereto. Notably, in an embodiment, the transmission between the connection device 4 and the in-car air conditioner 2 is through wireless communication transmission, but not limited thereto.

Please refer to FIG. 1A, FIG. 1B, FIG. 1D and FIG. 2C. The present disclosure provides a method of notifying in-car air pollution includes: a) providing an in-car air pollution detection system including at least one in-car gas detection module 1*a* for detecting an air pollution source in an interior space A of the car and transmitting an in-car gas detection datum, at least one out-car gas detection module 1*b* for detecting another air pollution source in an exterior space B outside the car and transmitting an out-car gas detection datum, an in-car air conditioner 2, a plurality of filtering and purification components 3 disposed in the interior space A of the car for filtering and purifying the air pollution source in the interior space A of the car, and a connection device 4 for receiving the in-car gas detection datum and the out-car gas detection datum, wherein the connection device 4 includes an audio element V and a display element D; b) notifying an initial value of the in-car gas detection datum of the interior space A of the car, wherein when the car is started to drive the in-car air pollution detection system, the initial value of the in-car gas detection datum of the interior space A of the car is detected by at least one in-car gas detection module 1*a* and transmitted to the connection device 4, the initial value of the in-car gas detection datum is broadcasted by the audio element V and/or displayed by the display element D of the connection device 4 for notification; c) notifying a post-purification value of the in-car gas detection datum of the interior space A of the car, wherein the in-car gas detection datum is continuously detected and transmitted to the connection device 4 by the at least one in-car gas detection module 1*a* after the air pollution source in the interior space A of the car is purified and filtered by the plurality of the filtering and purification components 3, the post-purification value of the in-car gas detection datum is transmitted to the connection device 4 by the at least one in-car gas detection module 1*a*, and the post-purification value of the in-car gas detection datum is broadcasted by the audio element V and/or displayed by the display element D of the connection device 4 for notification; and d) intelligently selecting to introduce or not to introduce an external gas into the interior space A of the car, wherein the in-car gas detection datum and the out-car gas detection datum are received and compared under the calculation of artificial intelligence by the connection device 4, the connection device 4 transmits instructions and controls the in-car air conditioner 2 so as to intelligently select and control to introduce or not to introduce the external gas in the exterior space B outside the car into the interior space A of the car, and the information of introducing or not introducing the external gas into the interior space A of the car is broadcasted by the audio element V and/or displayed by the display element D of the connection device 4 for notification.

Notably, the initial value of the in-car gas detection datum can be displayed by the display element D and broadcasted by the audio element V simultaneously in voice or sound effect to notify the initial value of the in-car gas detection datum. Preferably but not exclusively, the post-purification value of the in-car gas detection datum after the air pollution source in the interior space A of the car is purified and filtered by the plurality of the filtering and purification components 3 can be broadcasted simultaneously in voice or sound effect for notification. Preferably but not exclusively, the information of introducing or not introducing the external gas into the interior space A of the car can be displayed and broadcasted simultaneously in voice or sound effect. That is, the display of the display element D and the voice or sound effect of the audio element V can be synchronized, but not limited thereto. Alternatively, merely displaying by a single display element D or broadcasting in voice or sound effect by a single audio element V is also the modification and/or variation of the embodiments of the present disclosure. Notably, in an embodiment, the connection device 4 is a mobile phone device or a wearable device, but not limited thereto. Notably, in an embodiment, the transmission between the connection device 4 and the in-car air conditioner 2 is through wireless communication transmission, but not limited thereto.

Moreover, during the purification process of the filtering and purification component 3, the in-car air pollution detection system is operated continuously for a predetermined time, and a current value of the in-car gas detection datum is constantly detected and transmitted by the at least one in-car gas detection module 1a. That is to say that the aforementioned in-car gas detection datum is updated continually. In other words, the current value of the gas detection datum is detected and transmitted by the in-car gas detection module 1a within a time interval. However, the display element D or the audio element V is also operated continuously for displaying or broadcasting in voice or sound effect, in other words, the displaying or broadcasting is continuous. In other embodiments, the current value of the in-car gas detection datum is updated, displayed or broadcasted within a regular interval. Alternatively, the current value of the in-car gas detection datum may also be displayed or broadcasted immediately as the in-car gas detection data is changed. Notably, the processing time of the filtering and purification component 3 for the in-car air pollution detection system is operated continuously for a predetermined time of 5 minutes. Within the interval of the predetermined time, the current value of the in-car gas detection datum is detected and transmitted by the in-car gas detection module 1a. In other words, within the time interval of 5 minutes, the current value of the in-car gas detection datum is continuously detected and transmitted by the in-car gas detection module 1a, but not limited thereto. In addition, notably, if the audio element V broadcasts the in-car gas detection datum in the form of the sound effect, the sound effect indicating that the current value of the in-car gas detection datum tends to be cleaner (or better than the safe detection value) is different from the sound effect indicating that the current value of the in-car gas detection datum tends to be more polluted (or worse than the safe detection value), but not limited thereto.

Figure 1B:
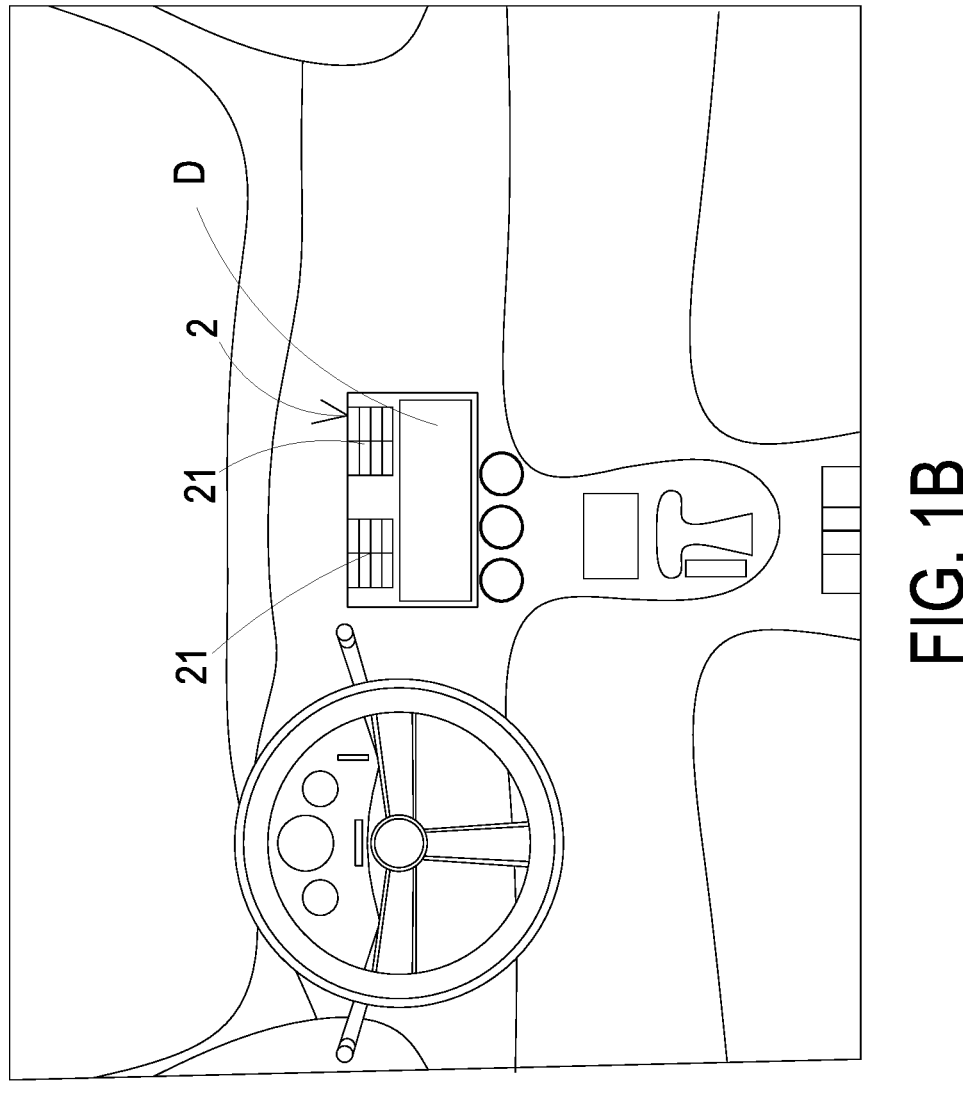
FIG. 1B is an exemplary schematic diagram illustrating the in-car air conditioner installed in the car for the method of notifying in-car air pollution according to the embodiment of the present disclosure.
Figure 1C:
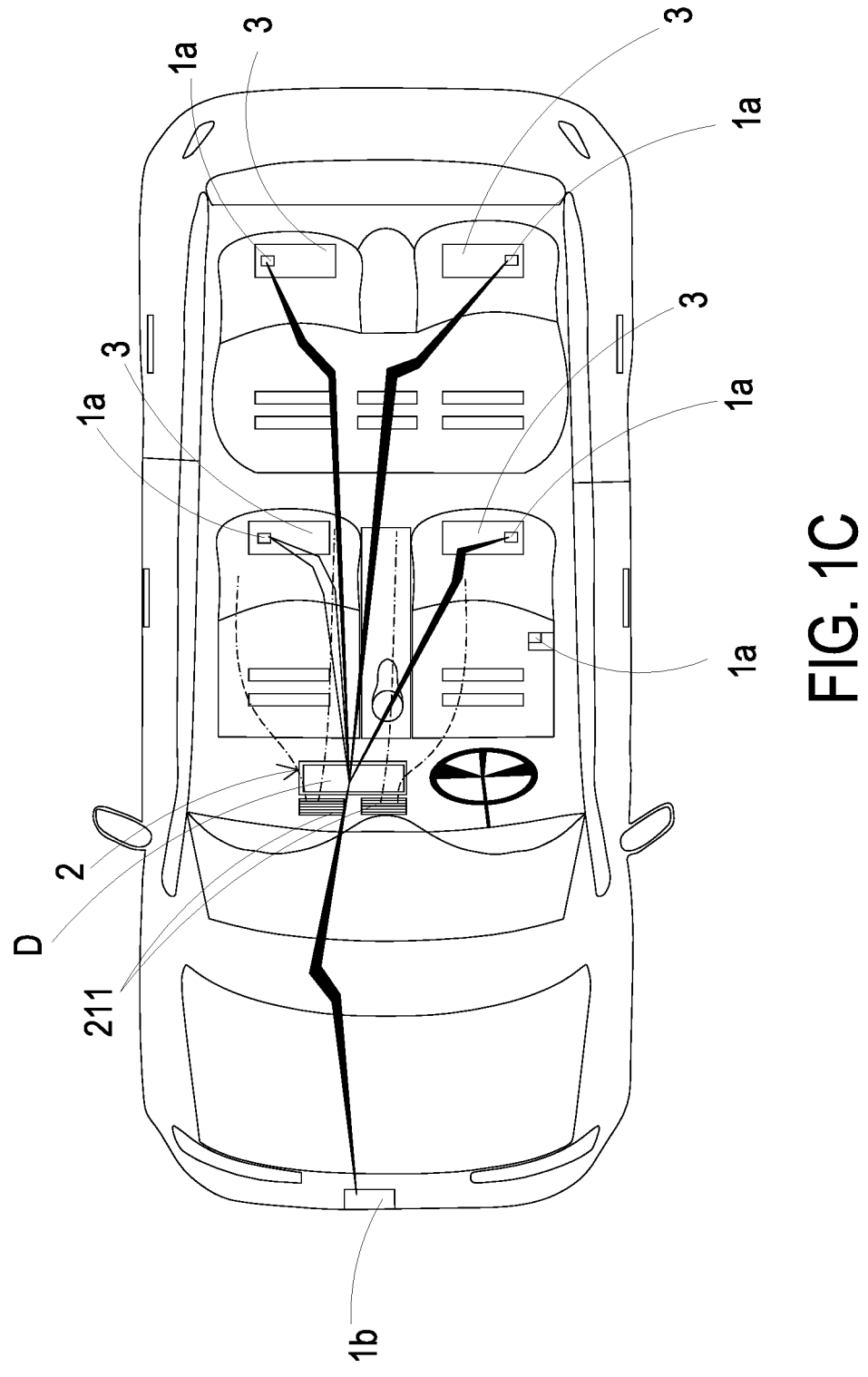
FIG. 1C is a first exemplary schematic diagram illustrating the gas detection modules, the in-car air conditioner and the filtering and purification components installed in the car for the method of notifying in-car air pollution according to the embodiment of the present disclosure.
Figure 1D:
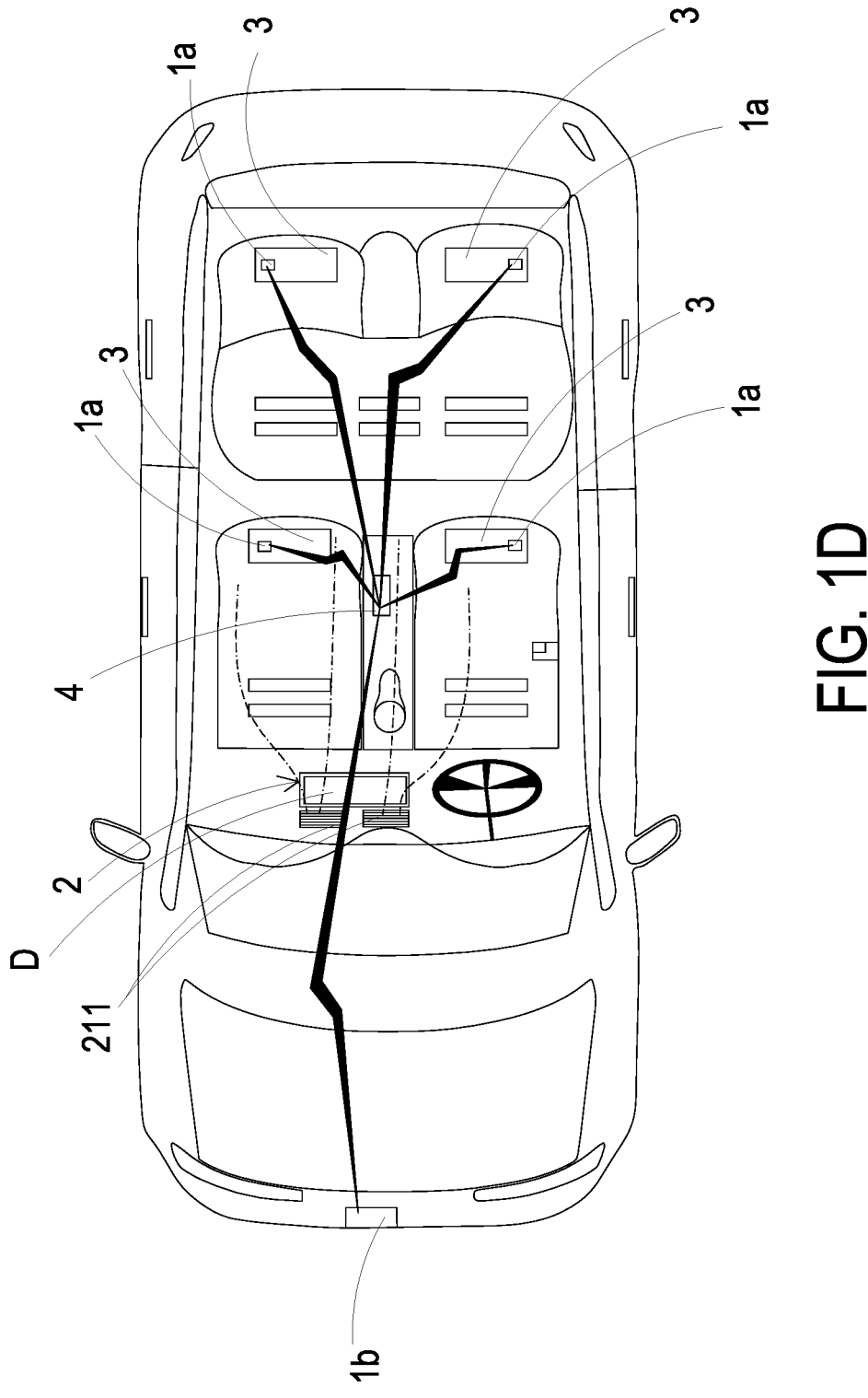
FIG. 1D is a second exemplary schematic diagram illustrating the gas detection modules, the in-car air conditioner, the filtering and purification components and the connection device installed in the car for the method of notifying in-car air pollution according to the embodiment of the present disclosure.

Please refer to FIG. 1A, FIG. 1B, FIG. 1C, FIG. 1D and FIG. 1E. A method of notifying in-car air pollution suitable for filtering or exchanging the air pollution source in a car is disclosed, so as to allow the air pollution source in the car to be filtered rapidly and provide clean, safe and breathable air. In the embodiment, the in-car air pollution detection system for the method of notifying in-car air pollution includes providing a plurality of gas detection modules (i.e. at least one in-car gas detection module 1a and at least one out-car gas detection module 1b), an in-car air conditioner 2, at least one filtering and purification component 3 and a connection device 4, as shown in FIG. 1D. Notably, in the embodiment, the plurality of filtering and purification components 3 are disposed in an interior space A of the car for filtering and purifying the air pollution source. Moreover, preferably but not exclusively, the number of the in-car gas detection modules 1a is exemplified by four and the number of the out-car gas detection module 1b is exemplified by one, but not limited thereto. Certainly, the number and the position of the in-car gas detection module 1a and the out-car gas detection module 1b are adjustable according to the practical requirements.

In the embodiment, the plurality of gas detection modules 1 includes four in-car gas detection modules 1a and one out-car gas detection module 1b. Preferably but not exclusively, the in-car gas detection modules 1a are disposed in the interior space A of the car, located at the four seats or adjacent to the four seats, to detect the air pollution source in the interior space A of the car. The out-car gas detection module 1b is disposed outside the car and is located at an external-gas inlet 212. The external gas in an exterior space B outside the car is inhaled through an external-gas inlet 212, flows through the filtering and purification component 3, and transported to an air outlet 211 through a ventilation channel 21, so that the external gas in the exterior space B outside the car is transported into the interior space A of the car through the air outlet 211. The gas in the interior space A of the car is controlled by an intake-control element 23 with two control modes: an interior circulation mode and an external ventilation mode. The interior circulation mode means that the gas in the interior space A of the car flows from the interior space A of the car through the interior ventilation channel 213 to the filtering and purification component 3 of the in-car air conditioner 2 for filtering, and then flows back into the interior space A of the car, so as to complete the interior circulation mode. The external ventilation mode means that the gas in the exterior space B outside the car flows from the external-gas inlet 212 into the filtering and purification component 3 of the in-car air conditioner 2, and then flows through the air outlet 211 into the interior space A of the car, so as to complete the external ventilation mode. Notably, as shown in FIG. 1B, there is one display element D below the ventilation channel 21 of the in-car air conditioner 2 for displaying real-time in-car gas detection module detected by the gas detection module 1. In addition, it should be noted that the position of the display element D or the audio element V (not shown) are adjustable according to the practical requirements, but not limited thereto.

The in-car gas detection module 1*a* is configured to detect the air pollution source in the interior space A of the car, and transmit an in-car gas detection datum. Preferably but not exclusively, in an embodiment, the in-car gas detection module 1*a* may be a mobile detection device. That is, the in-car gas detection module 1*a* can be a wearable device, such as a watch or a bracelet, directly worn on the human body (not shown). When people get into the interior space A of the car, it allows the wearable device to detect the air pollution source in the inner space of the car immediately at any time. The out-car gas detection module 1*b* is disposed in the exterior space B outside the car for detecting the external gas in the exterior space B outside the car, and transmitting the out-car gas detection datum.

In the embodiment, the in-car air conditioner 2 is configured to control the introduction of the external gas in the exterior space B outside the car to be introduced into the interior space A of the car or not introduced into the interior space A of the car. The in-car conditioner 2 includes a ventilation channel 21, a control drive unit 22 and an intake-control element 23. The control drive unit 22 has a display element D. Preferably but not exclusively, the display element D can be a touch screen, and can be used to set the control instructions of the in-car air conditioner 2 by touching the screen and display the in-car gas detection datum and the out-car gas detection datum.

Figure 1E:
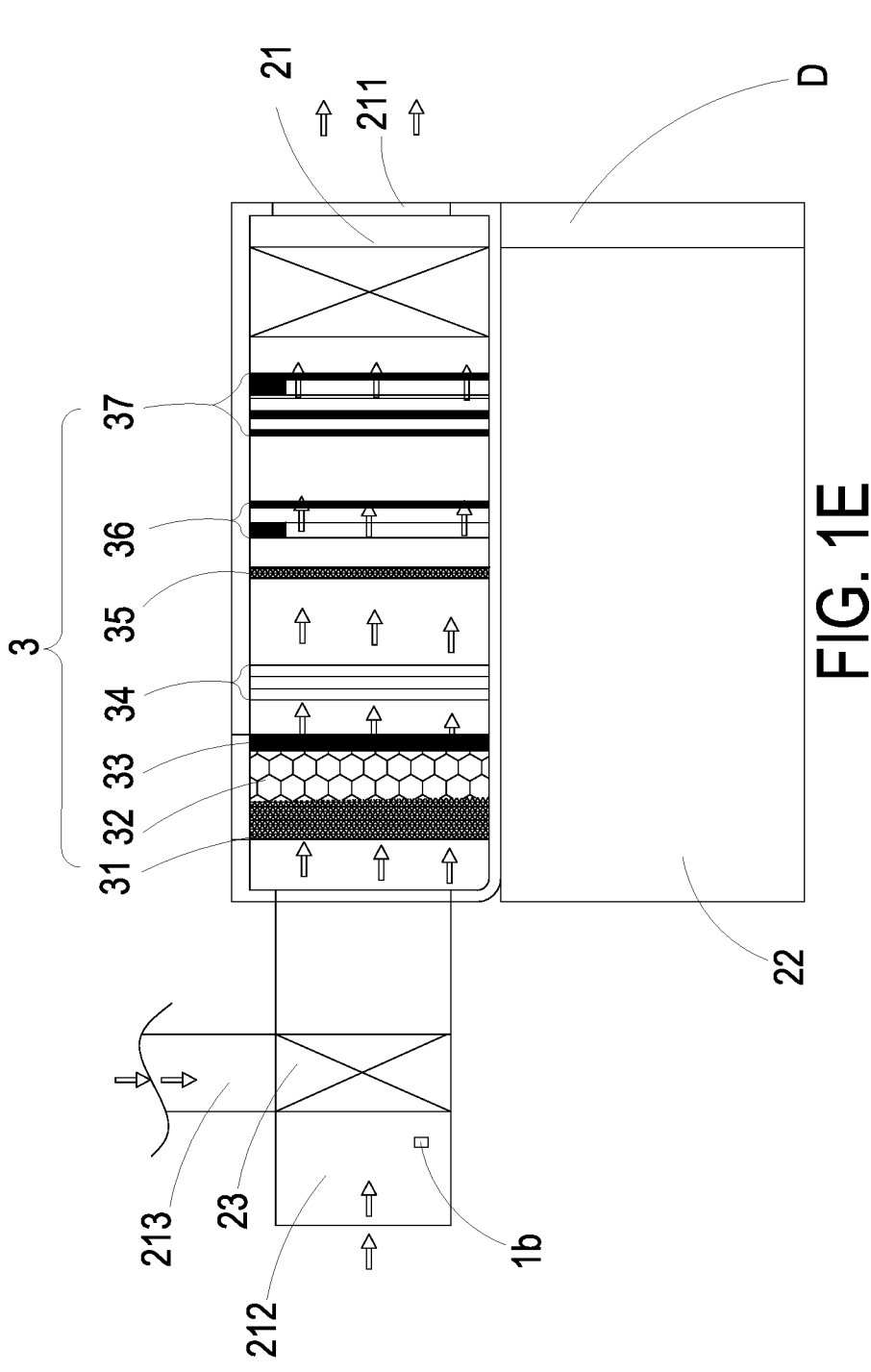
FIG. 1E is a first exemplary schematic cross-sectional view illustrating the in-car air conditioner and the filtering and purification component for the method of notifying in-car air pollution according to the embodiment of the present disclosure.
Figure 1F:
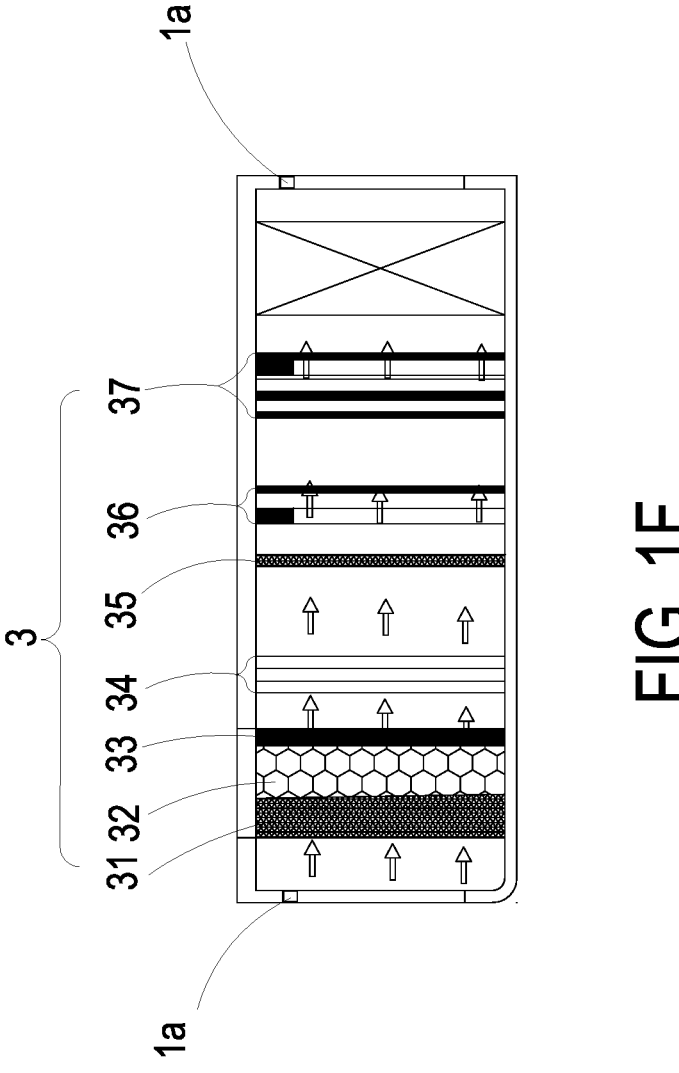
FIG. 1F is a first exemplary schematic cross-sectional view illustrating the filtering and purification component for the method of notifying in-car air pollution according to the embodiment of the present disclosure.
Figure 2A:
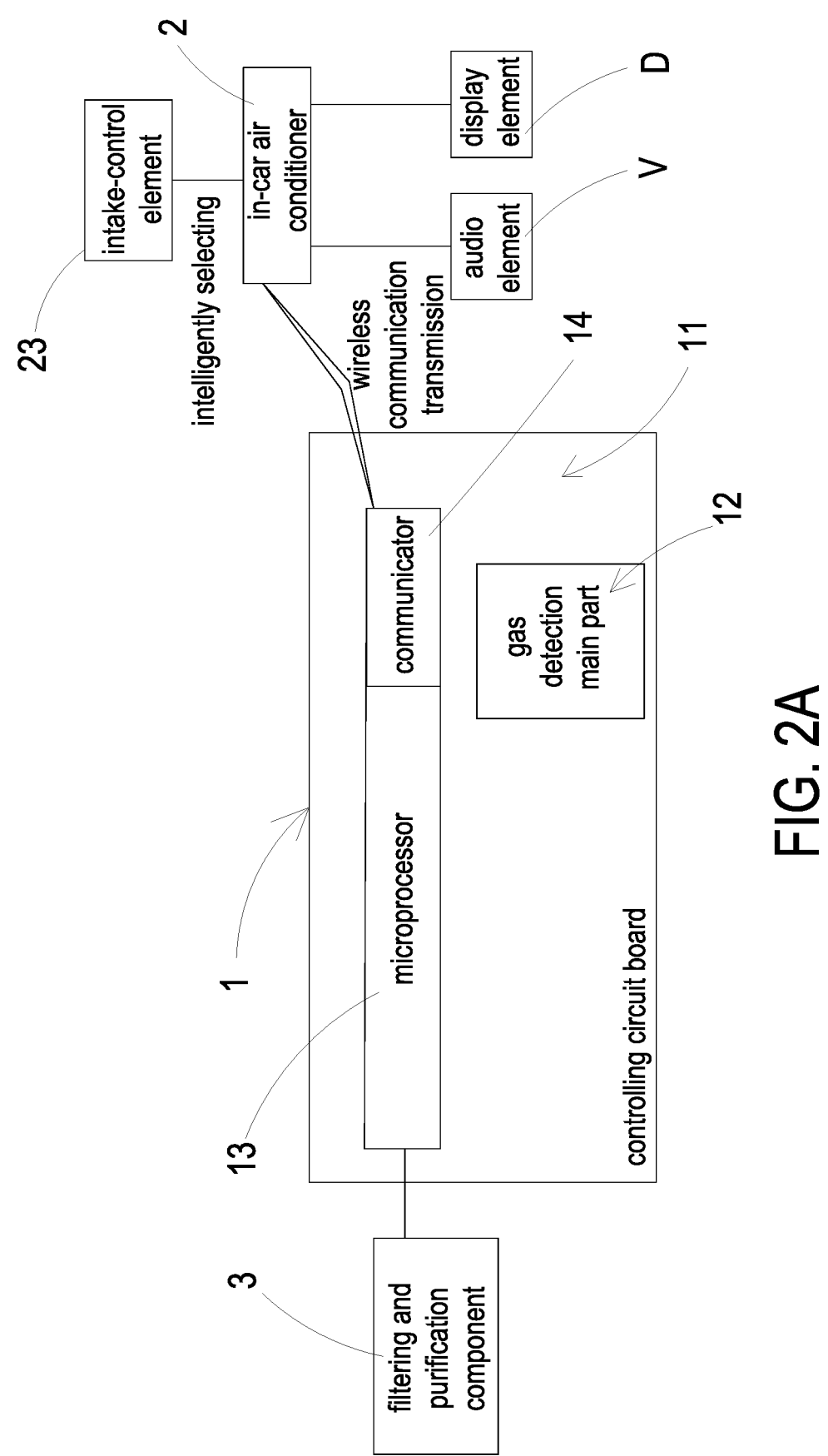
FIG. 2A is a first exemplary block diagram illustrating a telecommunication connecting configuration of the gas detection module, the in-car air conditioner (including the display element and the audio element) with the controlling circuit board and the filtering and purification component for the method of notifying in-car air pollution according to the embodiment of the present disclosure.
Figure 2B:
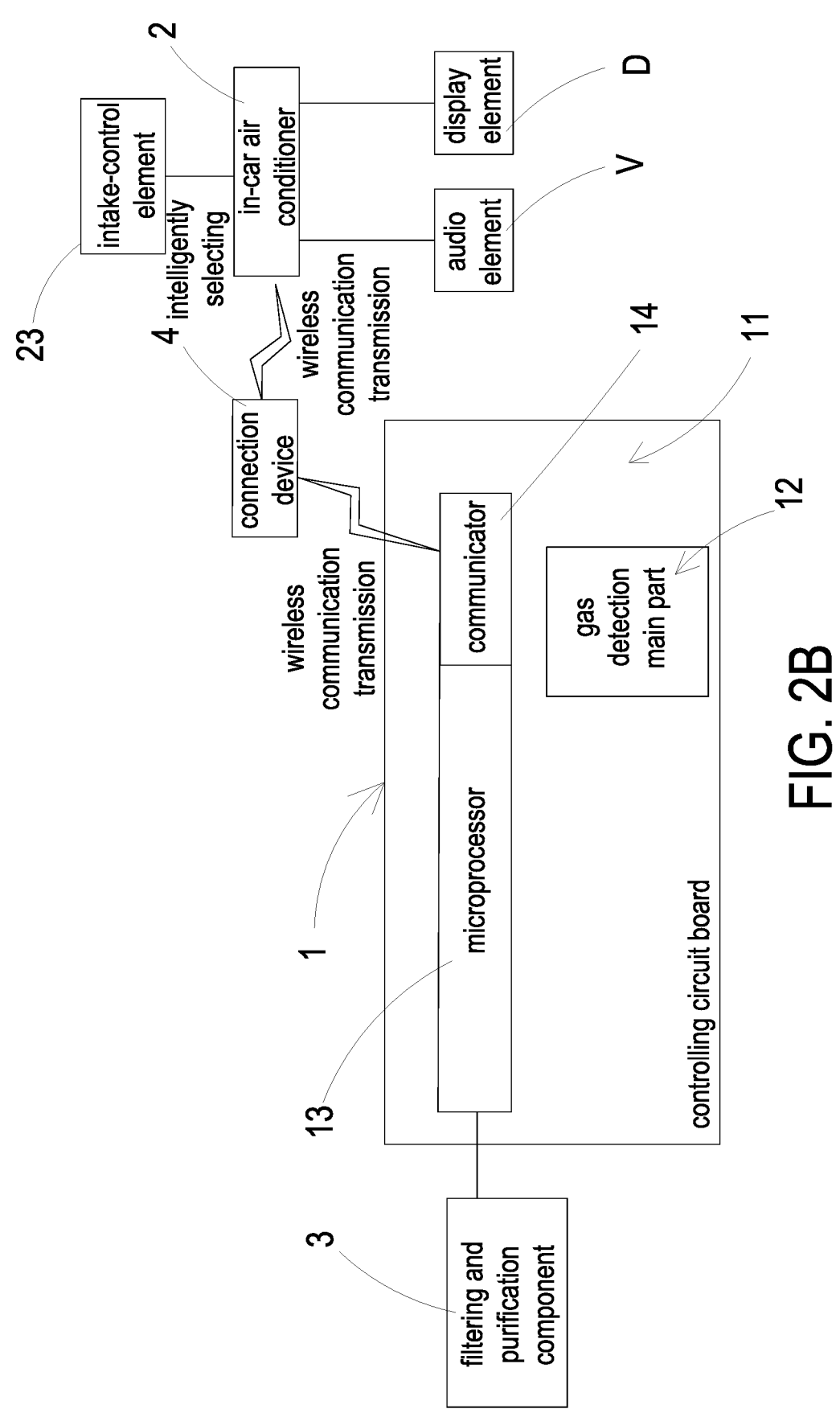
FIG. 2B is a first exemplary block diagram illustrating a telecommunication connecting configuration of the gas detection module, the in-car air conditioner (including the display element and the audio element) with the controlling circuit board, the filtering and purification component and the connection device for the method of notifying in-car air pollution according to the embodiment of the present disclosure.
Figure 2C:
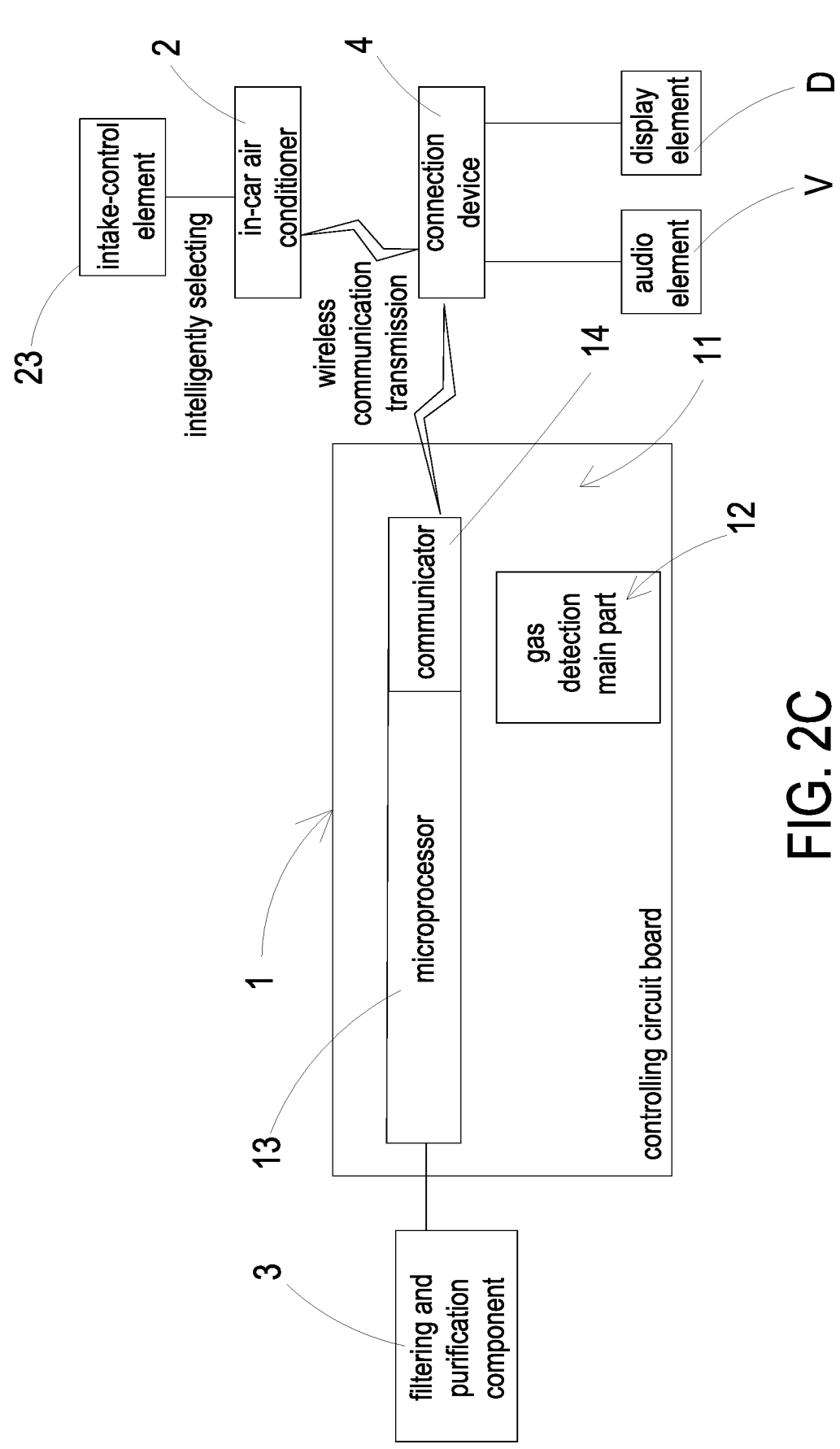
FIG. 2C is a first exemplary block diagram illustrating a telecommunication connecting configuration of the gas detection module, the in-car air conditioner, the connection device (including the display element and the audio element) with the controlling circuit board and the filtering and purification component for the method of notifying in-car air pollution according to the embodiment of the present disclosure.

Please refer to FIG. 1E, the in-car air conditioner 2 includes the ventilation channel 21 and the filtering and purification component 3 disposed in the ventilation channel 21 to filter and purify the air pollution source. The filtering and cleaning component 3 is disposed between the ventilation channel 21 and the intake-control element 23 of the in-car air conditioner 2 for filtering and purifying the air pollution source in the exterior space B outside the car. In that, the in-car gas detection datum outputted by the in-car gas detection modules 1*a* and the out-car gas detection datum outputted by the out-car gas detection module 1*b* can be received and compared by the control drive unit 22 of the in-car air conditioner 2. If the in-car gas detection datum is better than the out-car gas detection datum, the intake-control element 23 is operated in the interior circulation mode. If the out-car gas detection datum is better than the in-car gas detection datum, the intake-control element 23 is operated in an external ventilation mode. The opening and closing of the intake-control element 23 is controlled by the control drive unit 22 of the in-car air conditioner 2 through receiving and comparing the out-car gas detection datum outputted by the out-car gas detection module 1*b* with the in-car gas detection datum outputted by the in-car gas detection module 1*a*, so as to determine the opening and closing of the external-gas inlet 212 and selectively control the external gas in the exterior space B outside the car to be introduced into the interior space A of the car or not introduced into the interior space A of the car. Moreover, as shown in FIG. 1F, in a modified embodiment of the present disclosure, two in-car gas detection modules 1*a* are disposed on the upstream and downstream of the filtering and purification component 3, respectively, for detecting the in-car gas detection datum before and after the filtration procedure of the filtering and purification component 3. If the gas detection data before and after the filtering of the filtering and purification component 3 are maintained within a certain standard error or are better than the safe detection value, the filtering and cleaning components 3 in the car is allow to be suspended. If the gas detection datum after the filtering of the filtering and purification component 3 is obviously better than the gas detection datum before the filtering or the gas detection data before and after the filtering of the filtering and purification component 3 are both worse than the safe detection value, the filtering and purification component 3 in the car keeps on operated.

Please refer to FIG. 1E, FIG. 2A, FIG. 2B and FIG. 2C. In the embodiment, the in-car conditioner 2 includes a ventilation channel 21, a control drive unit 22 and an intake-control element 23. The ventilation channel 21 includes at least one air outlet 211, an external-gas inlet 212 and an in-car circulation channel 213. The external gas is inhaled through the external-gas inlet 212 controlled by the intake-control element 23 and introduced into the ventilation channel 21, and then is guided into the interior space A of the car through the air outlet 211. The intake-control element 23 also controls the gas in the interior space A of the car to be introduced from the in-car circulation channel 213, and then be guided into the interior space A of the car through the air outlet 211. The control drive unit 22 receives the in-car gas detection datum and the out-car gas detection datum and compares the in-car gas detection datum with the out-car gas detection datum under the calculation of artificial intelligence to intelligently select and control the intake-control element 23, so that the intake-control element 23 can control the external gas in the exterior space B outside the car to be introduced into the interior space A of the car or not to be introduced into the interior space A of the car.

In the embodiment, the gas detection module 1 includes a controlling circuit board 11, a gas detection main part 12, a microprocessor 13 and a communicator 14. The gas detection main part 12, the microprocessor 13 and the communicator 14 are integrally packaged on the controlling circuit board 11 and electrically connected to each other. The microprocessor 13 controls the detection of the gas detection main part 12, and the gas detection main part 12 detects the air pollution source and outputs a detection signal. The microprocessor 13 receives the detection signal for calculating, processing and outputting, so that the respective microprocessor 13 of the gas detection module 1 generates the gas detection datum, and provides the gas detection datum to the communicator 54 for external communication transmission.

Notably, the control drive unit 22 is also allowed to receive the control signal from the connection device 4, and intelligently select and control the intake-control element 23, so that the intake-control element 23 can control the introduction of the external gas from the exterior space B outside the car into the interior space A of the car, but not limited thereto. Moreover, notably, the information of the introduction or non-introduction of the external gas from the exterior space B of the car into the interior space A of the car controlled by the intake-control element 23 can be displayed by the display element D of the in-car air conditioner 2 and/or the display element D of the connecting device 4. Moreover, the voice or sound effect for the information of the introduction or non-introduction of the external gas from the exterior space of the car B into the interior space A of the car controlled by the intake-control element 23 can be broadcast by the audio element V of the in-car air conditioner 2 and/or the audio element V of the connection device 4, but not limited thereto.

Preferably but not exclusively, in an embodiment, the control drive unit 22 of the in-car air conditioner 2 can be used to receive and compare the in-car gas detection datum detected by the at least four in-car gas detection modules 1*a* under the calculation of artificial intelligence, so as to located the location of the air pollution source in the interior space A, and intelligently select and control the operation of the filtering and purification component 3 near the air pollution source for filtering the air pollution source.

In the embodiment, the monitoring mechanism of the air pollution source is enabled when the gas detection datum detected by the gas detection module 1 in the interior space A of the car is over a safe detection value. Preferably but not exclusively, the safe detection value includes at least one selected from the group consisting of suspended particles 2.5 concentration ($PM_{2.5}$) of less than 35 µg/m³, carbon dioxide content ($CO_2$) of less than 1000 ppm, total volatile organic compounds (TVOC) of less than 0.56 ppm, formaldehyde (HCHO) content of less than 0.08 ppm, the amount of bacteria of less than 1500 CFU/m³, the amount of fungi of less than 1000 CFU/m³, sulfur dioxide ($SO_2$) content of less than 0.075 ppm, nitrogen dioxide ($NO_2$) content of less than 0.1 ppm, carbon monoxide (CO) content of less than 9 ppm, ozone ($O_3$) content of less than 0.06 ppm, lead (Pb) content of less than 0.15 µg/m³ and a combination thereof.

Preferably but not exclusively, the air pollution source is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof.

In the embodiment, the monitoring mechanism of the air pollution source for the gas detection module in the interior space A of the car is enabled when the in-car gas detection datum detected by the in-car gas detection module 1a in the interior space A of the car is over a safe detection value. Preferably but not exclusively, the safe detection value includes one selected from the group consisting of suspended particles 2.5 concentration ($PM_{2.5}$) of less than 35 µg/m³, carbon dioxide content ($CO_2$) of less than 1000 ppm, total volatile organic compounds (TVOC) of less than 0.56 ppm, formaldehyde (HCHO) content of less than 0.08 ppm, the amount of bacteria of less than 1500 CFU/m³, the amount of fungi of less than 1000 CFU/m³, sulfur dioxide ($SO_2$) content of less than 0.075 ppm, nitrogen dioxide ($NO_2$) content of less than 0.1 ppm, carbon monoxide (CO) content of less than 9 ppm, ozone ($O_3$) content of less than 0.06 ppm, lead (Pb) content of less than 0.15 µg/m³ and a combination thereof.

Please refer to FIG. 1F. The aforementioned filtering and purification component 3 can be a combination of various implementations. Preferably but not exclusively, the filtering and purification component 3 includes an activated carbon 31, a high efficiency particulate air (HEPA) filter screen 32 and a zeolite screen 33. The activated carbon 31 is configured to filter and absorb the particulate matter 2.5 ($PM_{2.5}$), the zeolite screen 33 is configured to filter and absorb the volatile organic compounds (VOC), and the HEPA filter screen 32 is configured to absorb the chemical smoke, the bacteria, the dust particles and the pollen contained in the gas, so that the air pollution source introduced into the filtering and purification component 3 is filtered and purified to achieve the effect of filtering and purification. In some embodiment, the HEPA filter screen 32 is coated with a cleansing factor containing chlorine dioxide layer, so as to inhibit viruses, bacteria and fungi contained in gas introduced into the filtering and purification component 3. Preferably but not exclusively, the HEPA filter screen 32 is coated with a cleansing factor containing chlorine dioxide layer, so as to inhibit viruses, bacteria, fungi, influenza A, influenza B, enterovirus and norovirus in the air pollution source introduced into the filtering and purification component 3. The inhibition ratio is more than 99%, and it is helpful of reducing the cross-infection of viruses. In some embodiment, the HEPA filter screen 32 is coated with an herbal protective layer extracted from ginkgo and Japanese *Rhus chinensis* to form an herbal protective anti-allergic filter, so as to resist allergy effectively and destroy a surface protein of influenza virus (H1N1) introduced by the filtering and purification component 3 and passing through the HEPA filter screen 32. In some embodiment, the HEPA filter screen 32 is coated with a silver ion, so as to inhibit viruses and bacteria contained in the air pollution source introduced by the filtering and purification component 3.

In an embodiment, the filtering and purification component 3 includes the combination of an activated carbon 31, a high efficiency particulate air (HEPA) filter screen 32 and a zeolite screen 33, and a phot-catalyst unit 34. In that, the air pollution source is introduced into the filtering and purification component 3 and the light energy is converted into the chemical energy by the photo-catalyst unit 34, thereby decomposing harmful material in the air pollution source and disinfecting bacteria contained therein, so as to achieve the effects of filtering and purifying.

In an embodiment, the filtering and purification component 3 includes the combination of an activated carbon 31, a high efficiency particulate air (HEPA) filter screen 32 and a zeolite screen 33, and a photo-plasma unit 35. The photo-plasma unit 35 includes a nanometer irradiation tube. The air pollution source introduced by the filtering and purification component 3 is irradiated by the nanometer irradiation tube to decompose and purify volatile organic compounds contained in the air pollution source. When the air pollution source is introduced by the filtering and purification component 3, the introduced gas is irradiated by the nanometer irradiation tube, thereby oxygen molecules and water molecules contained in the air pollution are decomposed into high oxidizing photo-plasma, and generates an ion flow capable of destroying organic molecules. In that, volatile formaldehyde, volatile toluene and volatile organic compounds (VOC) contained in the air pollution are decomposed into water and carbon dioxide, so as to achieve the effects of filtering and purifying.

In an embodiment, the filtering and purification component 3 includes the combination of an activated carbon 31, a high efficiency particulate air (HEPA) filter screen 32 and a zeolite screen 33, and a negative ionizer 36. When the air pollution source introduced by the filtering and purification component 3 passes through a high voltage discharge, it makes the suspended particles in the air pollution source to carry with positive charge and adhered to the dust collecting plate carry with negative charges, so as to achieve the effects of filtering and purifying the air pollution source introduced.

In an embodiment, the filtering and purification component 3 includes the combination of an activated carbon 31, a high efficiency particulate air (HEPA) filter screen 32 and a zeolite screen 33, and a plasma ion unit 37. A high-voltage plasma column with plasma ion is formed by the plasma ion unit 37, so as to decompose viruses or bacteria contained in the air pollution source introduced by the filtering and purification component 3. The oxygen molecules and water molecules contained in the air pollution source are decomposed into positive hydrogen ions ($H^+$) and negative oxygen ions ($O_2^-$) by the plasma ion. The substances attached with water around the ions are adhered on the surface of viruses and bacteria and converted into OH radicals with extremely strong oxidizing power, thereby removing hydrogen (H) from the protein on the surface of viruses and bacteria, and thus decomposing (oxidizing) the protein, so as to filter the introduced air pollution source and achieve the effects of filtering and purifying.

In an embodiment, the filtering and cleaning component 3 may merely include the HEPA filter screen 32. In an embodiment, the HEPA filter screen 32 is combined with any one of the phot-catalyst unit 34, the photo-plasma unit 35, the negative ionizer 36 and the plasma ion unit 37. In an embodiment, the HEPA filter screen 32 is combined with a combination of any two of the phot-catalyst unit 34, the photo-plasma unit 35, the negative ionizer 36 and the plasma ion unit 37. In an embodiment, the HEPA filter screen 32 is combined with a combination of any three of the phot-catalyst unit 34, the photo-plasma unit 35, the negative ionizer 36 and the plasma ion unit 37. Alternatively, the HEPA filter screen 32 is combined with the phot-catalyst unit 34, the photo-plasma unit 35, the negative ionizer 36 and the plasma ion unit 37.

Notably, the service life of the HEPA filter screen 32 is calculated based on the monitoring mechanism of the gas detection data detected by the in-car gas detection module 1a and the out-car gas detection module 1b.

After understanding the method of notifying in-car air pollution of the present disclosure, the implementation devices for the method of notifying in-car air pollution of the present disclosure are described in detail as following.

Figure 3:
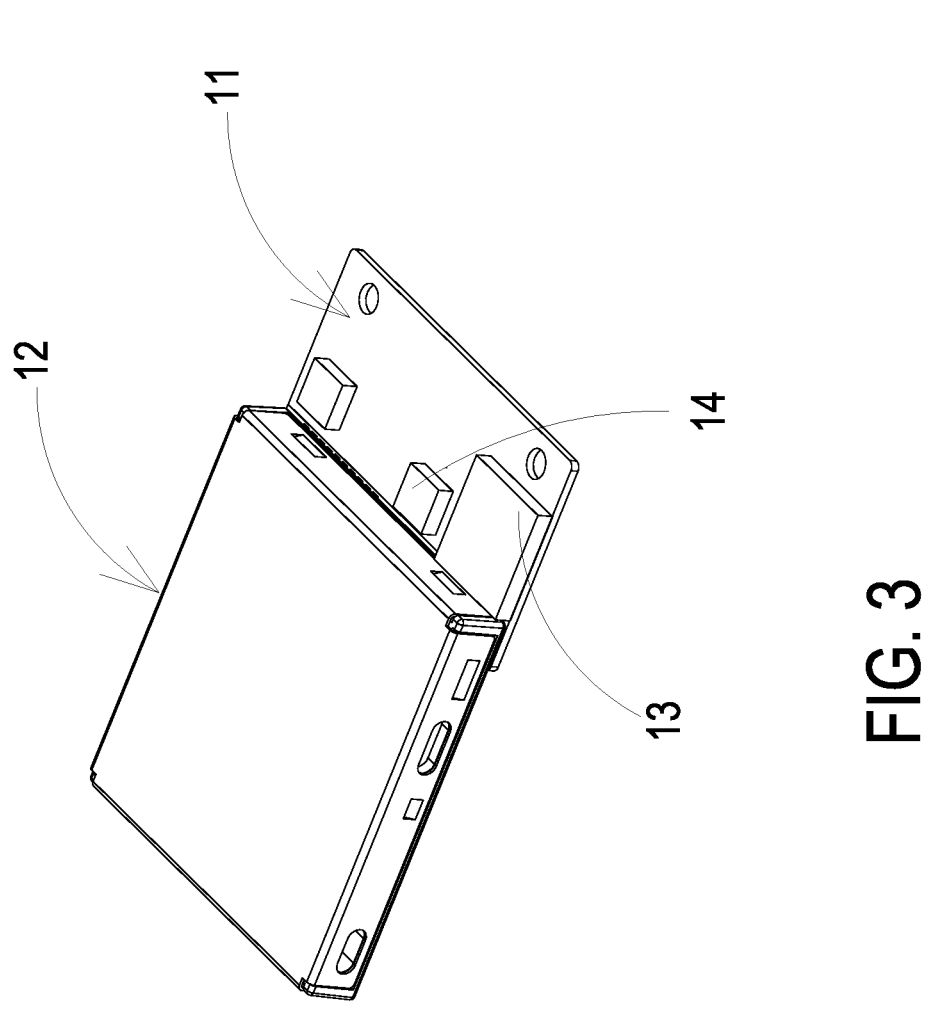
FIG. 3 is a schematic perspective view illustrating the gas detection module for the method of notifying in-car air pollution according to the embodiment of the present disclosure.
Figure 4A:
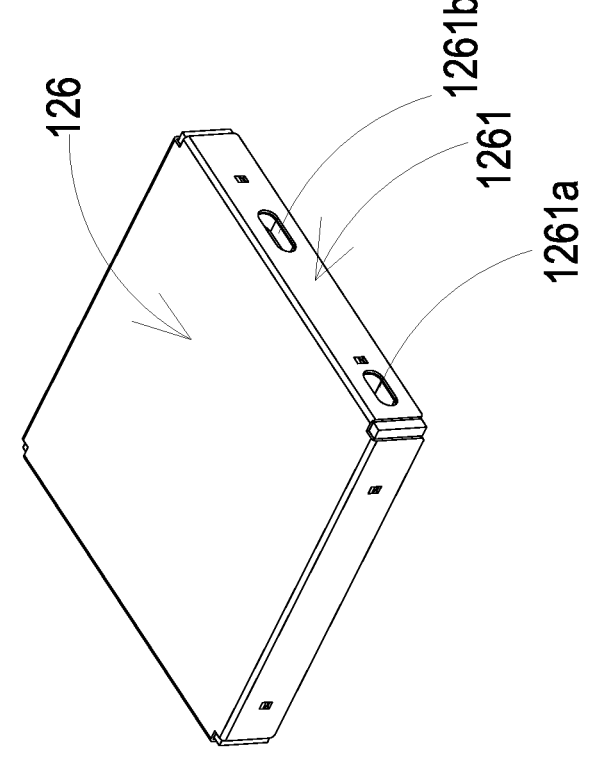
FIG. 4A is a schematic front perspective view illustrating the gas detection main part for the method of notifying in-car air pollution according to the embodiment of the present disclosure.
Figure 4B:
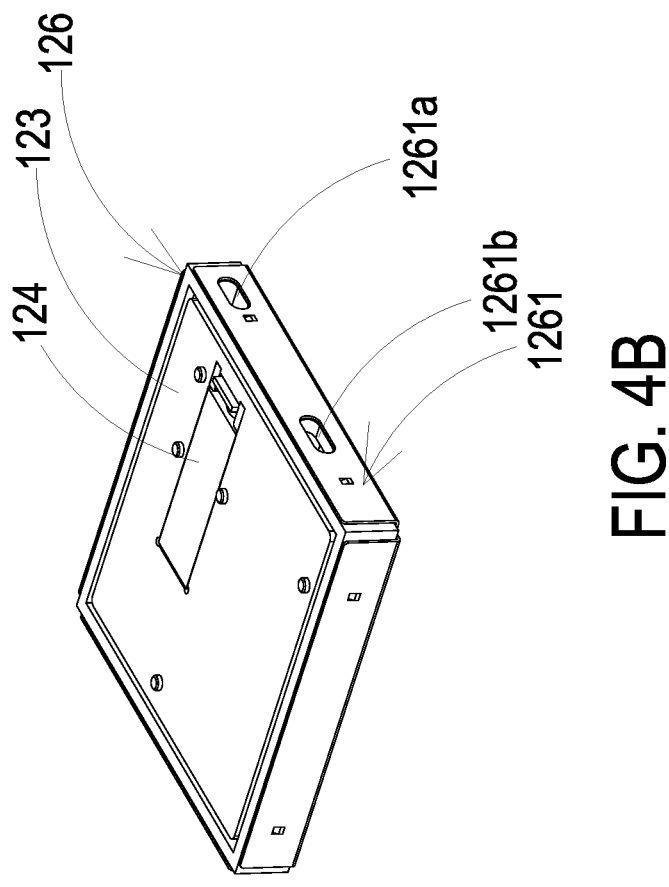
FIG. 4B is a schematic rear perspective view illustrating the gas detection main part for the method of notifying in-car air pollution according to the embodiment of the present disclosure.
Figure 4C:
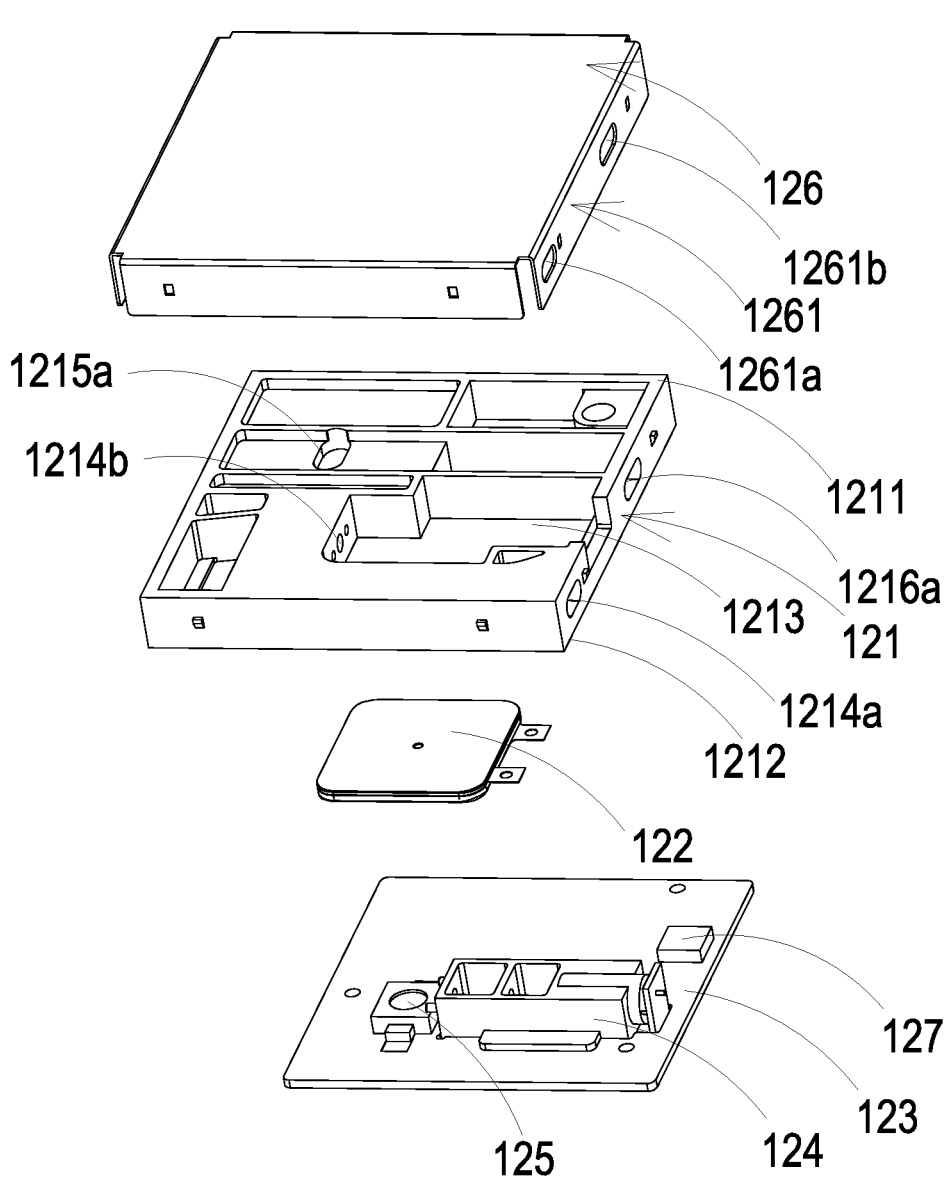
FIG. 4C is an exploded view illustrating the gas detection main part for the method of notifying in-car air pollution according to the embodiment of the present disclosure.
Figure 5A:
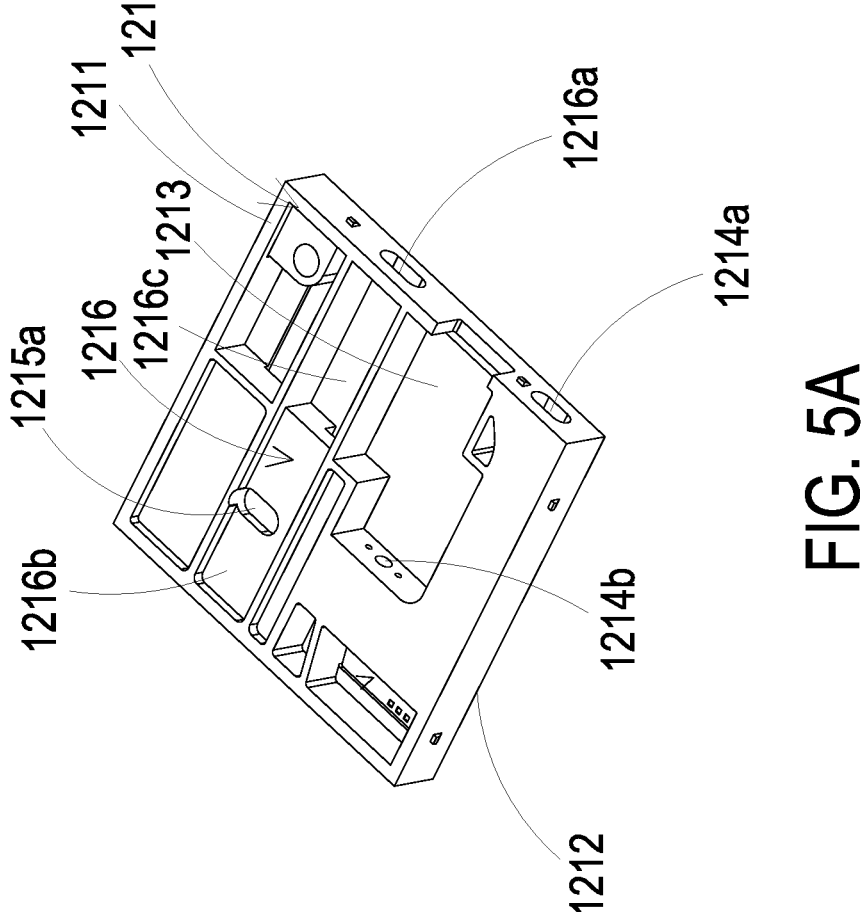
FIG. 5A is a schematic front perspective view illustrating the base of the gas detection main part for the method of notifying in-car air pollution according to the embodiment of the present disclosure.
Figure 5B:
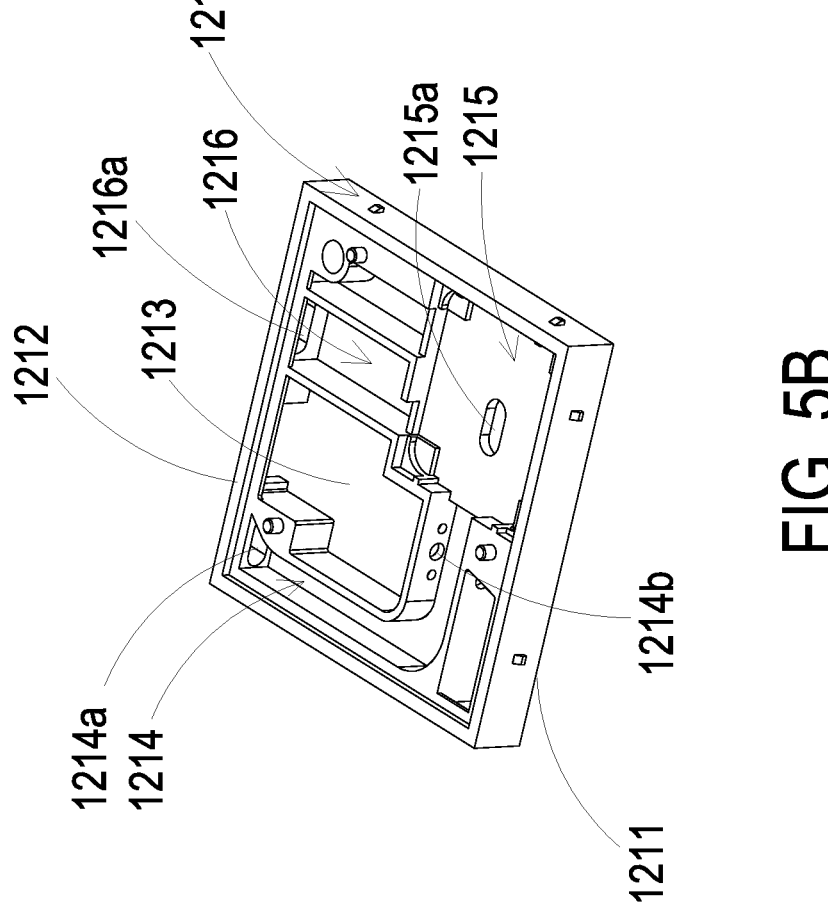
FIG. 5B is a schematic rear perspective view illustrating the base of the gas detection main part for the method of notifying in-car air pollution according to the embodiment of the present disclosure.
Figure 6:
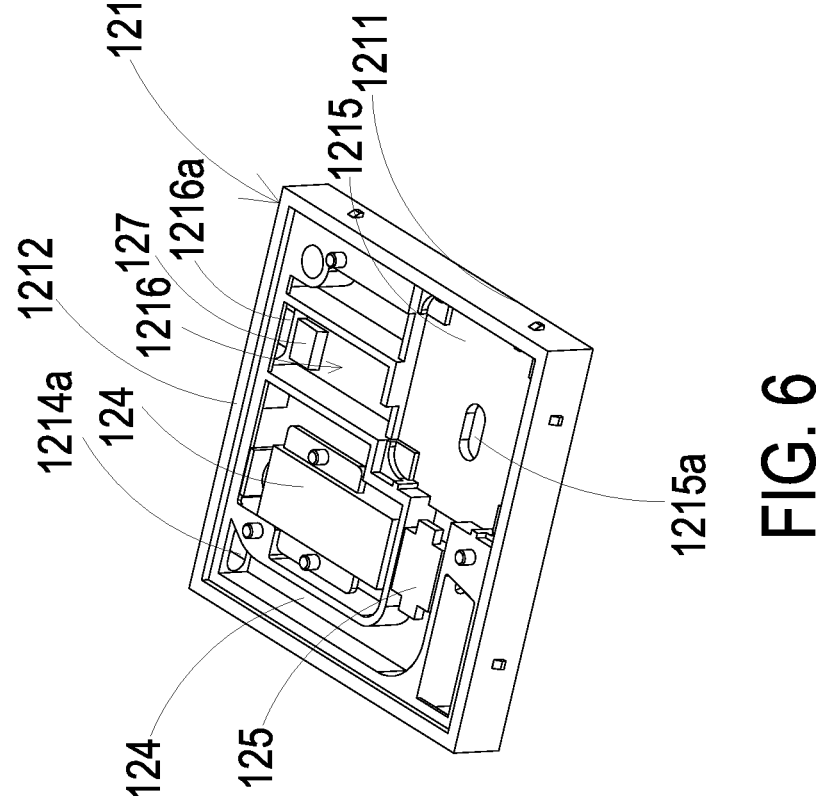
FIG. 6 is a schematic view illustrating a laser component combined within the base of the gas detection main part for the method of notifying in-car air pollution according to the embodiment of the present disclosure.
Figure 7A:
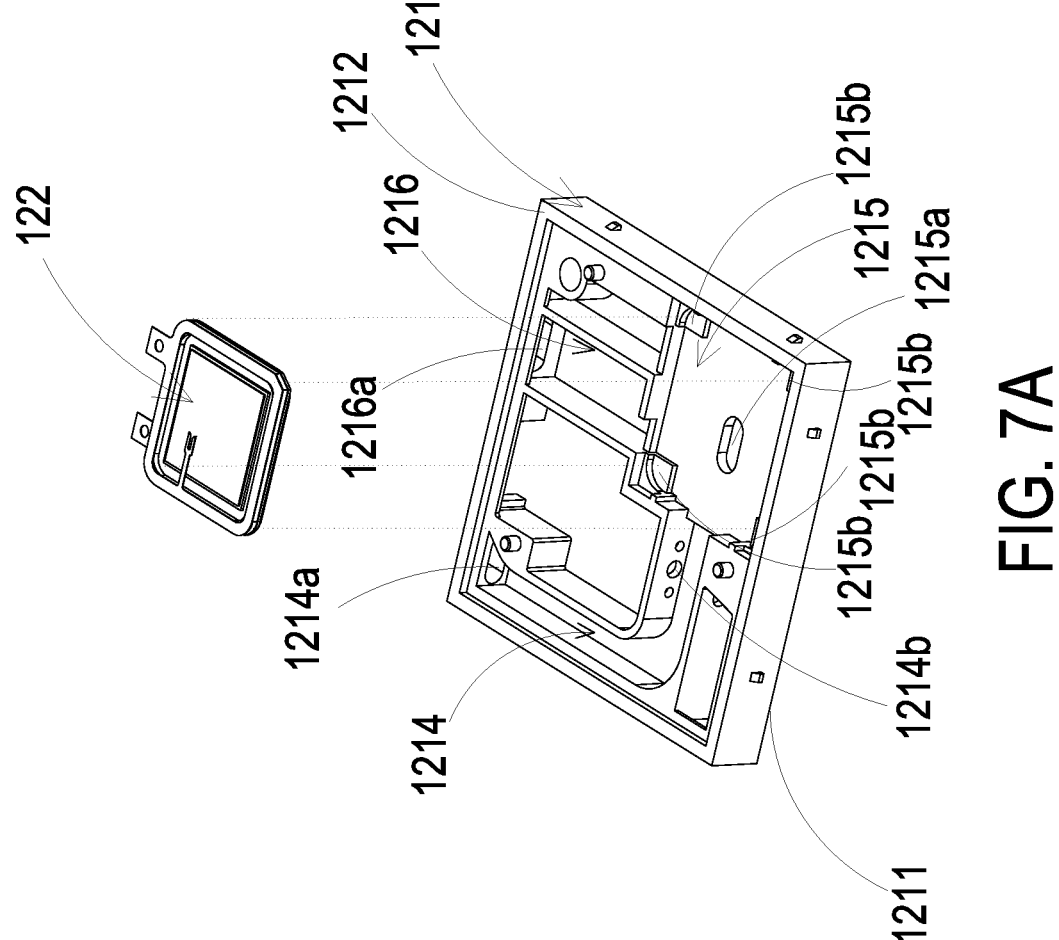
FIG. 7A is a schematic exploded view illustrating the combination of the piezoelectric actuator and the base of the gas detection main part for the method of notifying in-car air pollution according to the embodiment of the present disclosure.
Figure 7B:
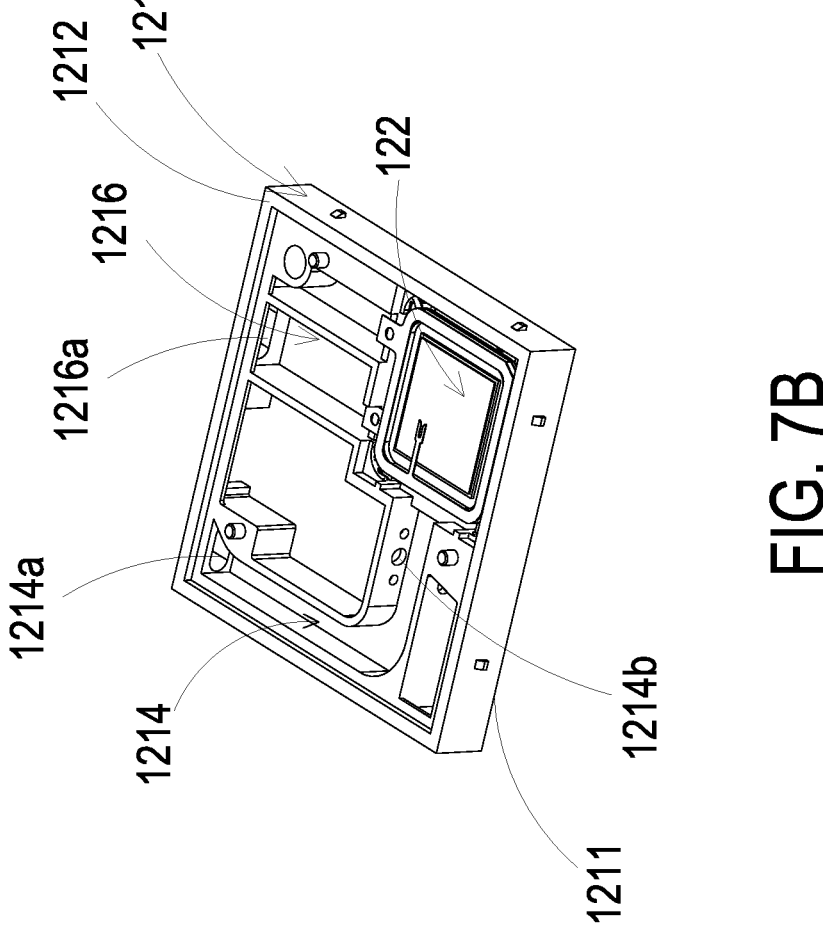
FIG. 7B is a schematic perspective view illustrating the combination of the piezoelectric actuator and the base of the gas detection main part for the method of notifying in-car air pollution according to the embodiment of the present disclosure.
Figure 8A:
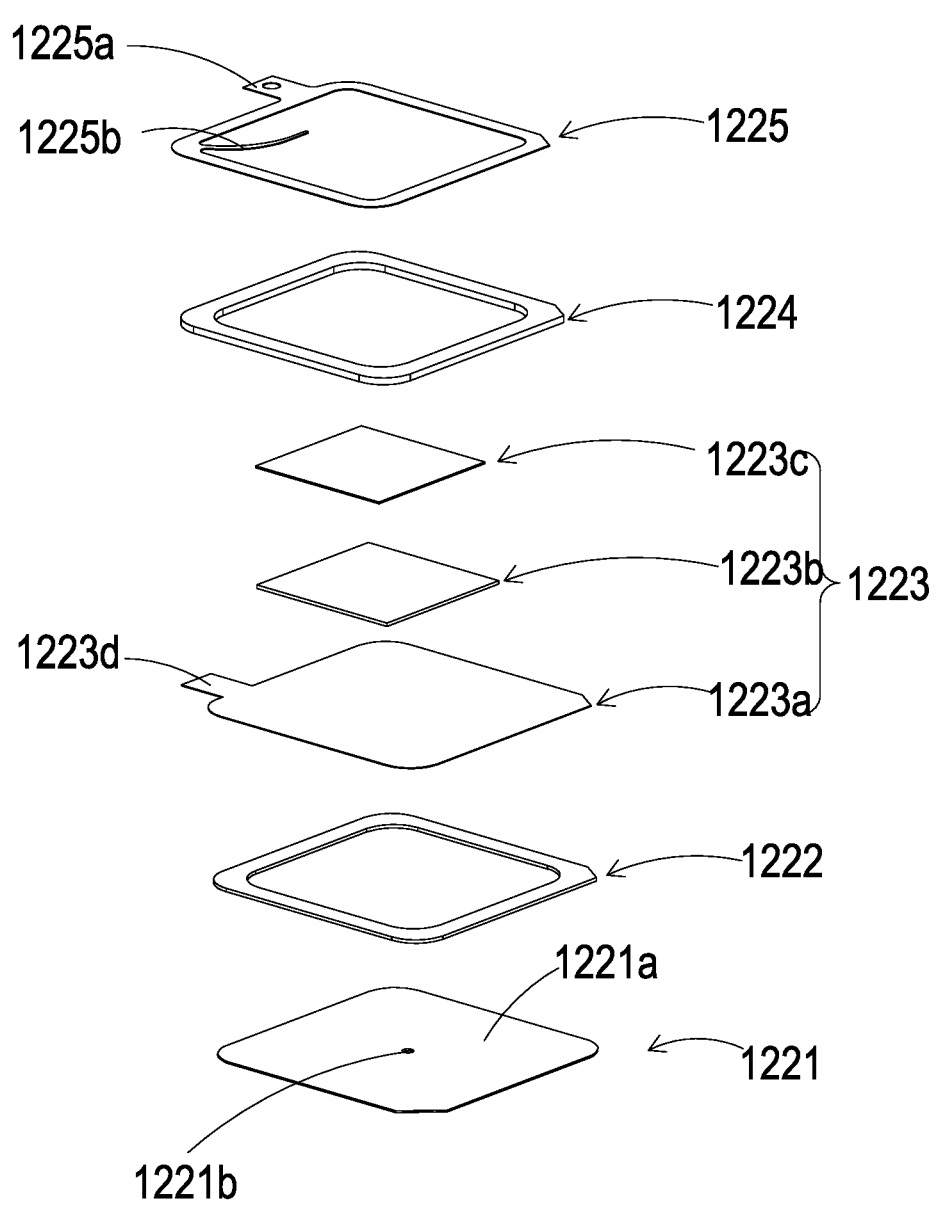
FIG. 8A is a schematic exploded front view illustrating the piezoelectric actuator of the gas detection main part for the method of notifying in-car air pollution according to the embodiment of the present disclosure.
Figure 8B:
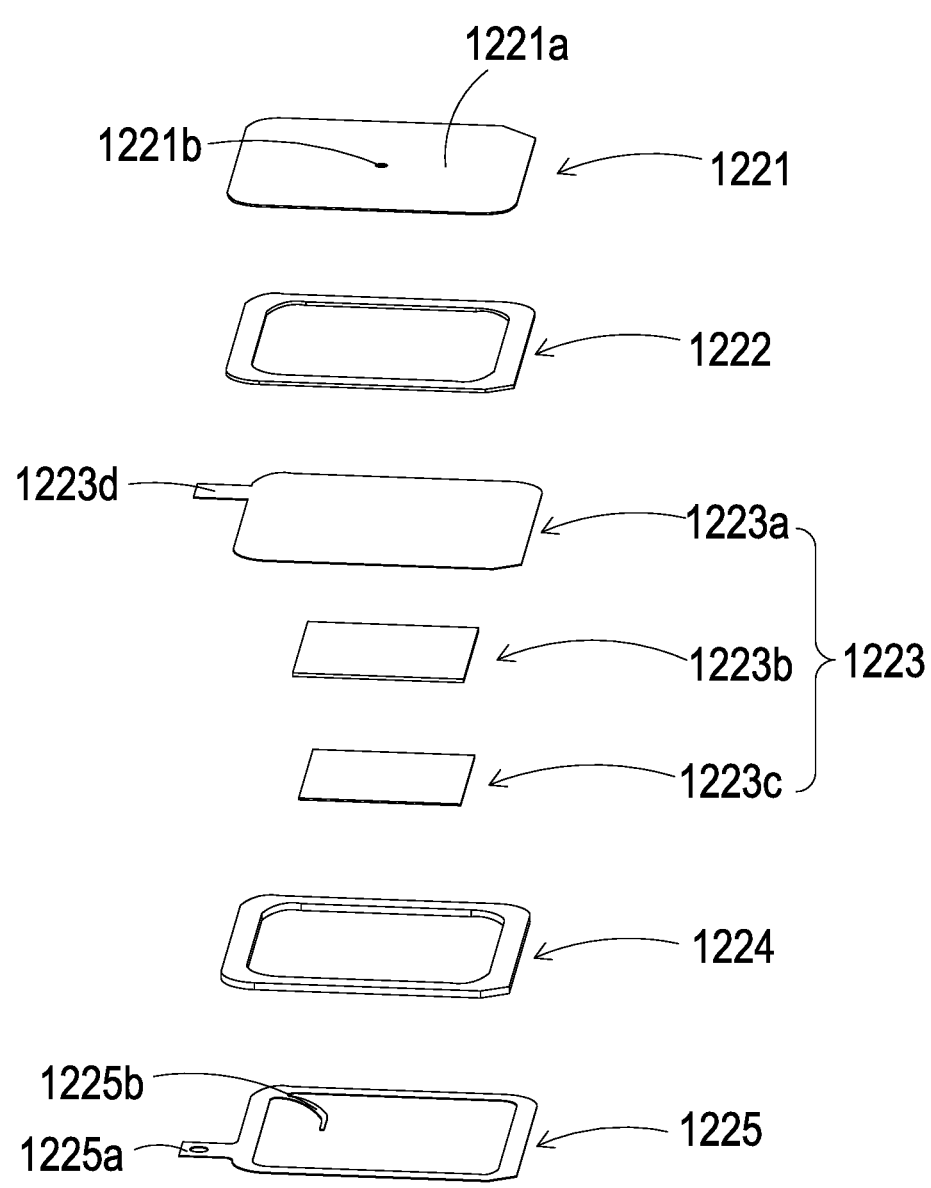
FIG. 8B is a schematic exploded rear view illustrating the piezoelectric actuator of the gas detection main part for the method of notifying in-car air pollution according to the embodiment of the present disclosure.

Please refer to FIG. 3. In the embodiment, the gas detection module 1 (i.e. the in-car gas detection module 1a and the out-car gas detection module 1b) includes a controlling circuit board 11, a gas detection main part 12, a microprocessor 13 and a communicator 14. The gas detection main part 12, the microprocessor 13 and the communicator 14 are integrally packaged on the controlling circuit board 11 and electrically connected to each other. In the embodiment, the microprocessor 13 and the communicator 14 are mounted on the controlling circuit board 11. The microprocessor 13 controls the driving signal of the gas detection main part 12 for enabling the detection, and receives the detection information of the air pollution source detected by the gas detection main part 12 for calculating, processing and outputting, and the communicator is used for external communication transmission. The detection information of the gas detection main part 12 is converted into detection datum for storage. The communicator 14 receives the gas detection datum output by the microprocessor 13, and transmits the gas detection datum to the cloud processing device (such as the in-car air conditioner 2 in FIG. 2A) or an external device (such as the connection device 4 in FIG. 2B or FIG. 2C.) Preferably but not exclusively, the external device is a portable mobile device (such as the connection device 4 in FIG. 2B or FIG. 2C.) The above-mentioned external communication transmission of the communicator 14 can be a wired two-way communication transmission or a wireless two-way communication transmission. Preferably but not exclusively, the wired two-way communication transmission is one selected form the group consisting of a USB communication transmission, a mini-USB communication transmission and a micro-USB communication transmission. Preferably but not exclusively, the wireless two-way communication transmission is one selected from the group consisting of a Wi-Fi communication transmission, a Bluetooth communication transmission, a radio frequency identification communication transmission and a near field communication (NFC) transmission.

In the embodiment, the air pollution source is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof.

Please refer to FIG. 4A to FIG. 9A. In the embodiment, the gas detection main part 12 includes a base 121, a piezoelectric actuator 122, a driving circuit board 123, a laser component 124, a particulate sensor 125, an outer cover 126 and a gas sensor 127. In the embodiment, the base 121 includes a first surface 1211, a second surface 1212, a laser loading region 1213, a gas-inlet groove 1214, a gas-guiding-component loading region 1215 and a gas-outlet groove 1216. The first surface 1211 and the second surface 1212 are two surfaces opposite to each other. In the embodiment, the laser loading region 1213 is hollowed out from the first surface 1211 toward the second surface 1212. The outer cover 126 covers the base 121 and includes a side plate 1261. The side plate 1261 has an inlet opening 1261a and an outlet opening 1261b. The gas-inlet groove 1214 is concavely formed from the second surface 1212 and disposed adjacent to the laser loading region 1213. The gas-inlet groove 1214 includes a gas-inlet 1214a and two lateral walls. The gas-inlet 1214a is in communication with an environment outside the base 121, and is spatially corresponding in position to an inlet opening 1261a of the outer cover 126. Two transparent windows 1214b are opened on the two lateral walls of the gas-inlet groove 1214 and are in communication with the laser loading region 1213. Therefore, the first surface 1211 of the base 121 is covered and attached by the outer cover 126, and the second surface 1212 is covered and attached by the driving circuit board 123, so that an inlet path is defined by the gas-inlet groove 1214.

In the embodiment, the gas-guiding-component loading region 1215 mentioned above is concavely formed from the second surface 1212 and in communication with the gas-inlet groove 1214. A ventilation hole 1215a penetrates a bottom surface of the gas-guiding-component loading region 1215. The gas-guiding-component loading region 1215 includes four positioning protrusions 1215b disposed at four corners of the gas-guiding-component loading region 1215, respectively. In the embodiment, the gas-outlet groove 1216 includes a gas-outlet 1216a, and the gas-outlet 1216a is spatially corresponding to the outlet opening 1261b of the outer cover 126. The gas-outlet groove 1216 includes a first section 1216b and a second section 1216c. The first section 1216b is concavely formed out from the first surface 1211 on a region spatially corresponding to a vertical projection area of the gas-guiding-component loading region 1215. The second section 1216c is hollowed out from the first surface 1211 to the second surface 1212 in a region where the first surface 1211 is extended from the vertical projection area of the gas-guiding-component loading region 1215. The first section 1216b and the second section 1216c are connected to form a stepped structure. Moreover, the first section 1216b of the gas-outlet groove 1216 is in communication with the ventilation hole 1215a of the gas-guiding-component loading region 1215, and the second section 1216c of the gas-outlet groove 1216 is in communication with the gas-outlet 1216a. In that, when first surface 1211 of the base 121 is attached and covered by the outer cover 126, and the second surface 1212 of the base 121 is attached and covered by the driving circuit board 123, the gas-outlet groove 1216 and the driving circuit board 123 collaboratively define an outlet path.

In the embodiment, the laser component 124, the particulate sensor 125 and the gas sensor 127 are disposed on and electrically connected to the driving circuit board 123 and located within the base 121. In order to clearly describe and illustrate the positions of the laser component 124, the particulate sensor 125 and the gas sensor 127 in the base 121, the driving circuit board 123 is intentionally omitted. The laser component 124 is accommodated in the laser loading region 1213 of the base 121, and the particulate sensor 125 is accommodated in the gas-inlet groove 1214 of the base 121 and is aligned to the laser component 124. In addition, the laser component 124 is spatially corresponding to the transparent window 1214*b*, therefore a light beam emitted by the laser component 124 passes through the transparent window 1214*b* and is irradiated into the gas-inlet groove 1214. A light beam path emitted from the laser component 124 passes through the transparent window 1214*b* and extends in an orthogonal direction perpendicular to the gas-inlet groove 1214. In the embodiment, a projecting light beam emitted from the laser component 124 passes through the transparent window 1214*b* and enters the gas-inlet groove 1214 to irradiate the suspended particles contained in the gas passing through the gas-inlet groove 1214. When the suspended particles contained in the gas are irradiated and generate scattered light spots, the scattered light spots are received and calculated by the particulate sensor 125 to obtain the gas detection information. In the embodiment, the gas sensor 127 is positioned and disposed on the driving circuit board 123, electrically connected to the driving circuit board 123, and accommodated in the gas-outlet groove 1216, so as to detect the air pollution source introduced into the gas-outlet groove 1216. Preferably but not exclusively, in an embodiment, the gas sensor 127 includes a volatile-organic-compound sensor for detecting the information of carbon dioxide ($CO_2$) or volatile organic compounds (TVOC). Preferably but not exclusively, in an embodiment, the gas sensor 127 includes a formaldehyde sensor for detecting the information of formaldehyde (HCHO) gas. Preferably but not exclusively, in an embodiment, the gas sensor 127 includes a bacteria sensor for detecting the information of bacteria or fungi. Preferably but not exclusively, in an embodiment, the gas sensor 127 includes a virus sensor for detecting the information of virus in the gas. Preferably but not exclusively, the gas sensor 127 is a temperature and humidity sensor for detecting the temperature and humidity information of the gas.

In the embodiment, the piezoelectric actuator 122 is accommodated in the square-shaped gas-guiding-component loading region 1215 of the base 121. In addition, the gas-guiding-component loading region 1215 of the base 121 is in fluid communication with the gas-inlet groove 1214. When the piezoelectric actuator 122 is enabled, the gas in the gas-inlet groove 1214 is inhaled by the piezoelectric actuator 122, so that the gas flows into the piezoelectric actuator 122, and is transported into the gas-outlet groove 1216 through the ventilation hole 1215*a* of the gas-guiding-component loading region 1215. Moreover, the driving circuit board 123 covers the second surface 1212 of the base 121, and the laser component 124 is positioned and disposed on the driving circuit board 123, and is electrically connected to the driving circuit board 123. The particulate sensor 125 is also positioned and disposed on the driving circuit board 123 and electrically connected to the driving circuit board 123. In that, when the outer cover 126 covers the base 121, the inlet opening 1261*a* is spatially corresponding to the gas-inlet 1214*a* of the base 121, and the outlet opening 1261*b* is spatially corresponding to the gas-outlet 1216*a* of the base 121.

In the embodiment, the piezoelectric actuator 122 includes a gas-injection plate 1221, a chamber frame 1222, an actuator element 1223, an insulation frame 1224 and a conductive frame 1225. In the embodiment, the gas-injection plate 1221 is made by a flexible material and includes a suspension plate 1221*a* and a hollow aperture 1221*b*. The suspension plate 1221*a* is a sheet structure and is permitted to undergo a bending deformation. Preferably but not exclusively, the shape and the size of the suspension plate 1221*a* are accommodated in the inner edge of the gas-guiding-component loading region 1215, but not limited thereto. The hollow aperture 1221*b* passes through a center of the suspension plate 1221*a*, so as to allow the gas to flow therethrough. Preferably but not exclusively, in the embodiment, the shape of the suspension plate 1221*a* is selected from the group consisting of a square, a circle, an ellipse, a triangle and a polygon, but not limited thereto.

In the embodiment, the chamber frame 1222 is carried and stacked on the gas-injection plate 1221. In addition, the shape of the chamber frame 1222 is corresponding to the gas-injection plate 1221. The actuator element 1223 is carried and stacked on the chamber frame 1222. A resonance chamber 1226 is collaboratively defined by the actuator element 1223, the chamber frame 1222 and the suspension plate 1221*a* and is formed between the actuator element 1223, the chamber frame 1222 and the suspension plate 1221*a*. The insulation frame 1224 is carried and stacked on the actuator element 1223 and the appearance of the insulation frame 1224 is similar to that of the chamber frame 1222. The conductive frame 1225 is carried and stacked on the insulation frame 1224, and the appearance of the conductive frame 1225 is similar to that of the insulation frame 1224. In addition, the conductive frame 1225 includes a conducting pin 1225*a* and a conducting electrode 1225*b*. The conducting pin 1225*a* is extended outwardly from an outer edge of the conductive frame 1225, and the conducting electrode 1225*b* is extended inwardly from an inner edge of the conductive frame 1225.

Moreover, the actuator element 1223 further includes a piezoelectric carrying plate 1223*a*, an adjusting resonance plate 1223*b* and a piezoelectric plate 1223*c*. The piezoelectric carrying plate 1223*a* is carried and stacked on the chamber frame 1222. The adjusting resonance plate 1223*b* is carried and stacked on the piezoelectric carrying plate 1223*a*. The piezoelectric plate 1223*c* is carried and stacked on the adjusting resonance plate 1223*b*. The adjusting resonance plate 1223*b* and the piezoelectric plate 1223*c* are accommodated in the insulation frame 1224. The conducting electrode 1225*b* of the conductive frame 1225 is electrically connected to the piezoelectric plate 1223*c*. In the embodiment, the piezoelectric carrying plate 1223*a* and the adjusting resonance plate 1223*b* are made by a conductive material. The piezoelectric carrying plate 1223*a* includes a piezoelectric pin 1223*d*. The piezoelectric pin 1223*d* and the conducting pin 1225*a* are electrically connected to a driving circuit (not shown) of the driving circuit board 123, so as to receive a driving signal, such as a driving frequency and a driving voltage. Through this structure, a circuit is formed by the piezoelectric pin 1223*d*, the piezoelectric carrying plate 1223*a*, the adjusting resonance plate 1223*b*, the piezoelectric plate 1223*c*, the conducting electrode 1225*b*, the conductive frame 1225 and the conducting pin 1225*a* for transmitting the driving signal. Moreover, the insulation frame 1224 is insulated between the conductive frame 1225 and the actuator element 1223, so as to avoid the occurrence of a short circuit. Thereby, the driving signal is transmitted to the piezoelectric plate 1223*c*. After receiving the driving signal such as the driving frequency and the driving voltage, the piezoelectric plate 1223*c* deforms due to the piezoelectric effect, and the piezoelectric carrying plate 1223*a* and the adjusting resonance plate 1223*b* are further driven to generate the bending deformation in the reciprocating manner.

Furthermore, in the embodiment, the adjusting resonance plate 1223*b* is located between the piezoelectric plate 1223*c* and the piezoelectric carrying plate 1223*a* and served as a cushion between the piezoelectric plate 1223*c* and the piezoelectric carrying plate 1223*a*. Thereby, the vibration frequency of the piezoelectric carrying plate 1223*a* is adjustable. Basically, the thickness of the adjusting resonance plate 1223*b* is greater than the thickness of the piezoelectric carrying plate 1223*a*, and the vibration frequency of the actuator element 1223 can be adjusted by adjusting the thickness of the adjusting resonance plate 1223*b*. In the embodiment, the gas-injection plate 1221, the chamber frame 1222, the actuator element 1223, the insulation frame 1224 and the conductive frame 1225 are stacked and positioned in the gas-guiding-component loading region 1215 sequentially, so that the piezoelectric actuator 122 is supported and positioned in the gas-guiding-component loading region 1215. A plurality of clearances 1221*c* are defined between the suspension plate 1221*a* of the gas-injection plate 1221 and an inner edge of the gas-guiding-component loading region 1215 for gas flowing therethrough.

A flowing chamber 1227 is formed between the gas-injection plate 1221 and the bottom surface of the gas-guiding-component loading region 1215. The flowing chamber 1227 is in communication with the resonance chamber 1226 between the actuator element 1223, the chamber frame 1222 and the suspension plate 1221*a* through the hollow aperture 1221*b* of the gas-injection plate 1221. By controlling the vibration frequency of the gas in the resonance chamber 1226 to be close to the vibration frequency of the suspension plate 1221*a*, the Helmholtz resonance effect is generated between the resonance chamber 1226 and the suspension plate 1221*a*, so as to improve the efficiency of gas transportation. When the piezoelectric plate 1223*c* is moved away from the bottom surface of the gas-guiding-component loading region 1215, the suspension plate 1221*a* of the gas-injection plate 1221 is driven to move away from the bottom surface of the gas-guiding-component loading region 1215 by the piezoelectric plate 1223*c*. In that, the volume of the flowing chamber 1227 is expanded rapidly, the internal pressure of the flowing chamber 1227 is decreased to form a negative pressure, and the gas outside the piezoelectric actuator 122 is inhaled through the clearances 1221*c* and enters the resonance chamber 1226 through the hollow aperture 1221*b*. Consequently, the pressure in the resonance chamber 1226 is increased to generate a pressure gradient. When the suspension plate 1221*a* of the gas-injection plate 1221 is driven by the piezoelectric plate 1223*c* to move toward the bottom surface of the gas-guiding-component loading region 1215, the gas in the resonance chamber 1226 is discharged out rapidly through the hollow aperture 1221*b*, and the gas in the flowing chamber 1227 is compressed, thereby the converged gas is quickly and massively ejected out of the flowing chamber 1227 under the condition close to an ideal gas state of the Benulli's law, and transported to the ventilation hole 1215*a* of the gas-guiding-component loading region 1215.

Figure 9A:
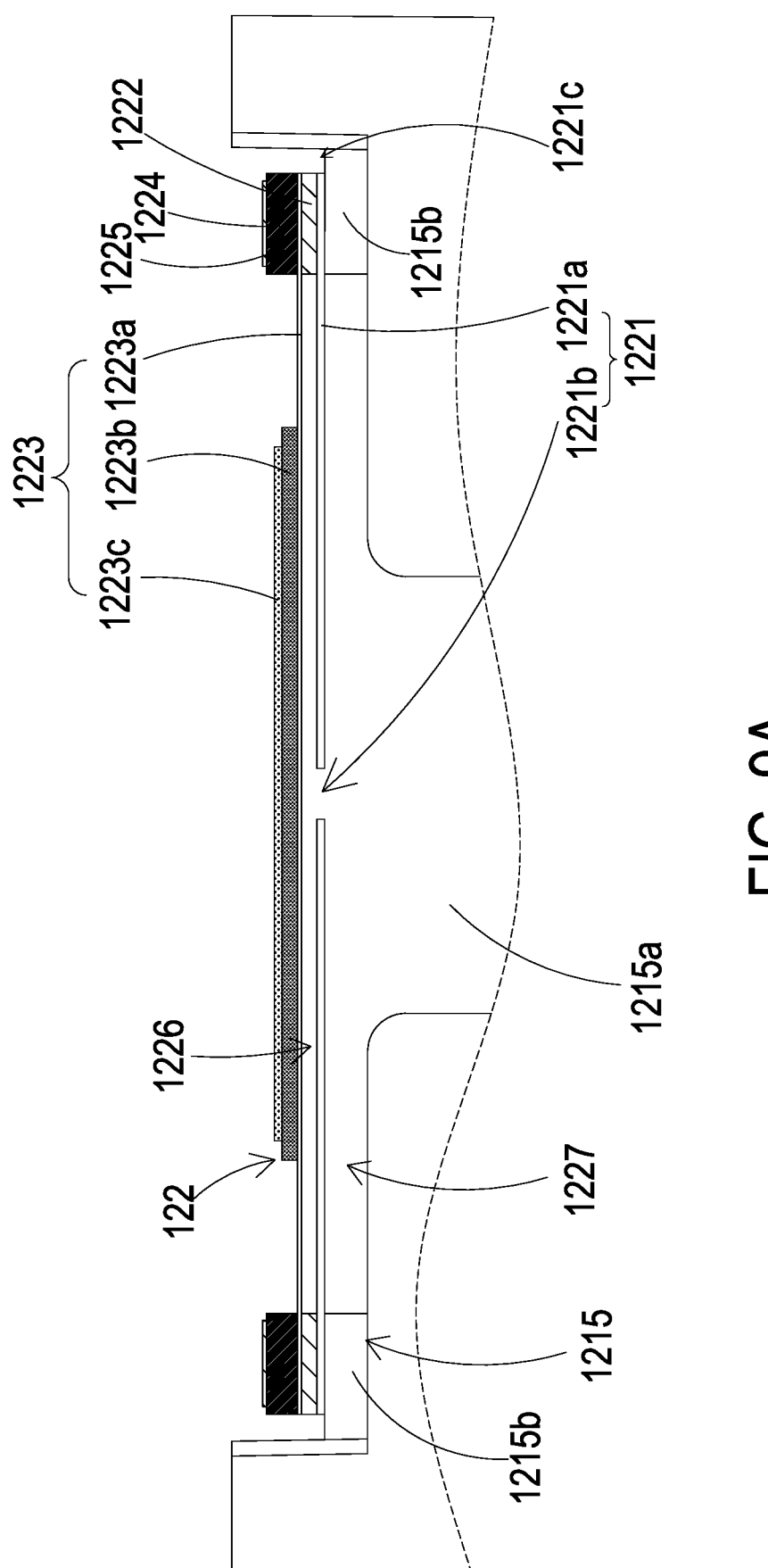
FIG. 9A is a schematic cross-sectional view illustrating the piezoelectric actuator of the gas detection main part for the method of notifying in-car air pollution according to the embodiment of the present disclosure.
Figure 9B:
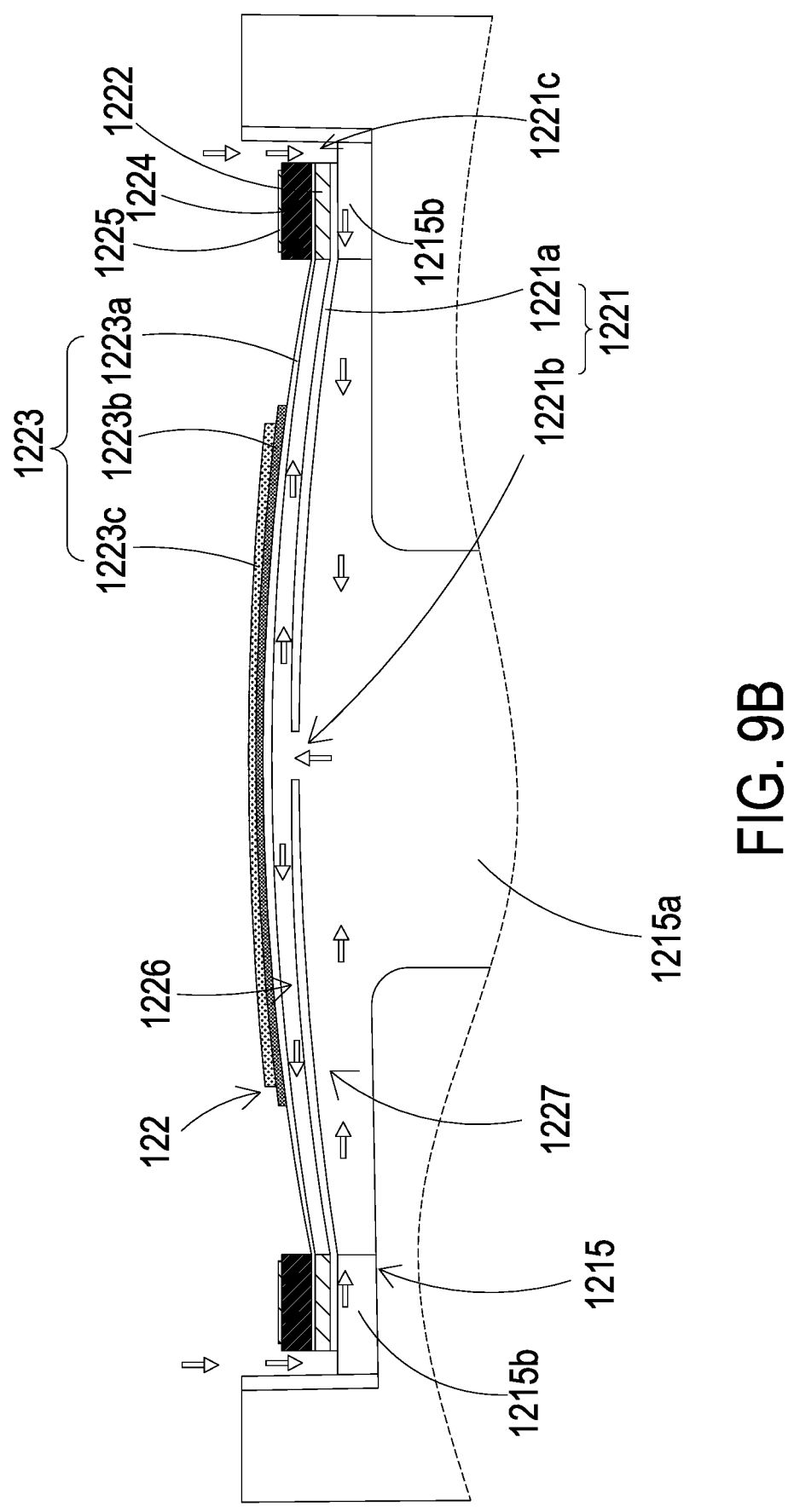
FIG. 9B is a schematic cross-sectional view illustrating a first operation step of the piezoelectric actuator of the gas detection main part for the method of notifying in-car air pollution according to the embodiment of the present disclosure.
Figure 9C:
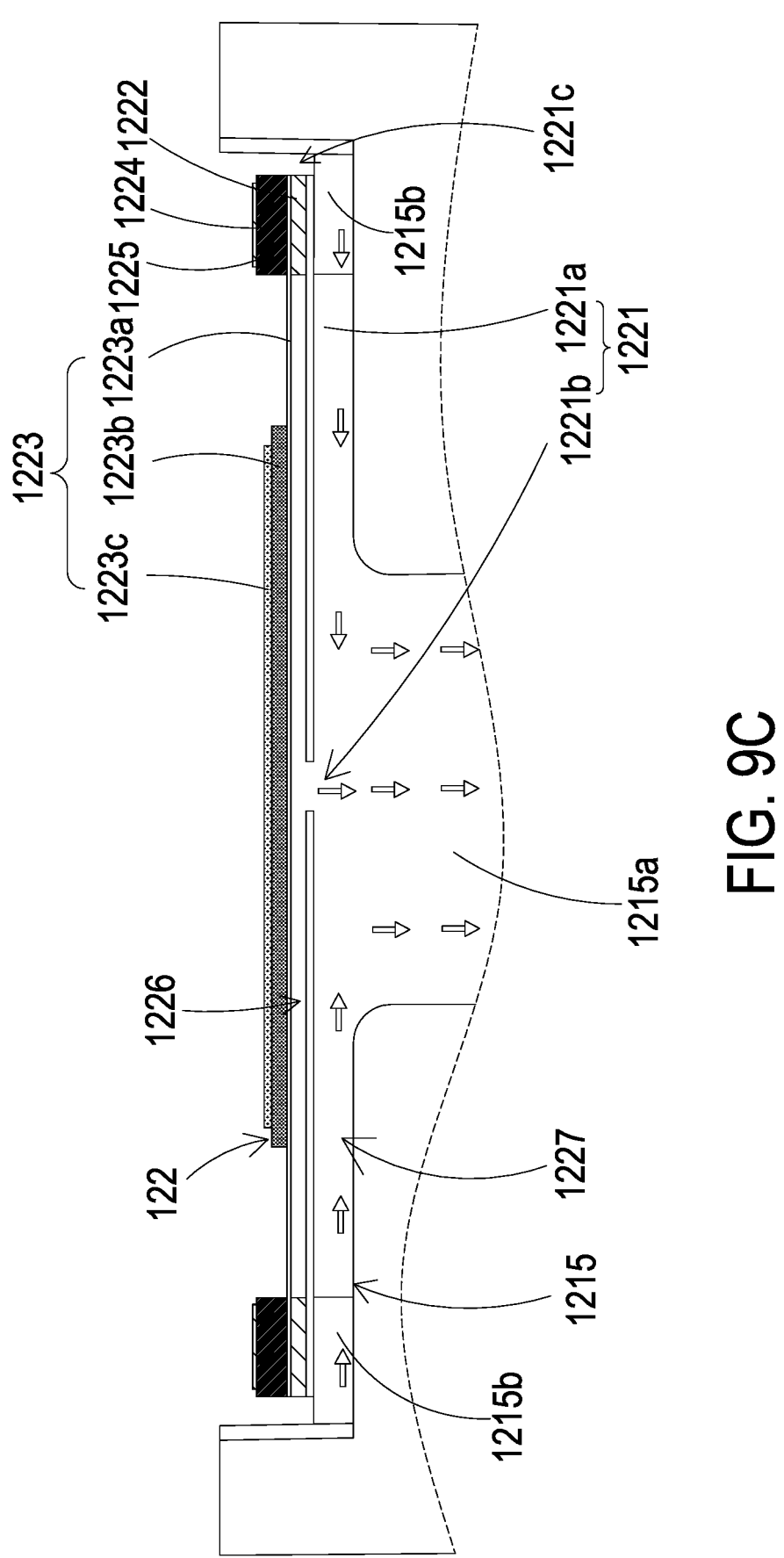
FIG. 9C is a schematic cross-sectional view illustrating a second operation step of the piezoelectric actuator of the gas detection main part for the method of notifying in-car air pollution according to the embodiment of the present disclosure.

By repeating the above operation steps shown in FIG. 9B and FIG. 9C, the piezoelectric plate 1223*c* is driven to generate the bending deformation in a reciprocating manner. According to the principle of inertia, since the gas pressure inside the resonance chamber 1226 is lower than the equilibrium gas pressure after the converged gas is ejected out, the gas is introduced into the resonance chamber 1226 again. Moreover, the vibration frequency of the gas in the resonance chamber 1226 is controlled to be close to the vibration frequency of the piezoelectric plate 1223*c*, so as to generate the Helmholtz resonance effect to achieve the gas transportation at high speed and in large quantities.

Figure 10A:
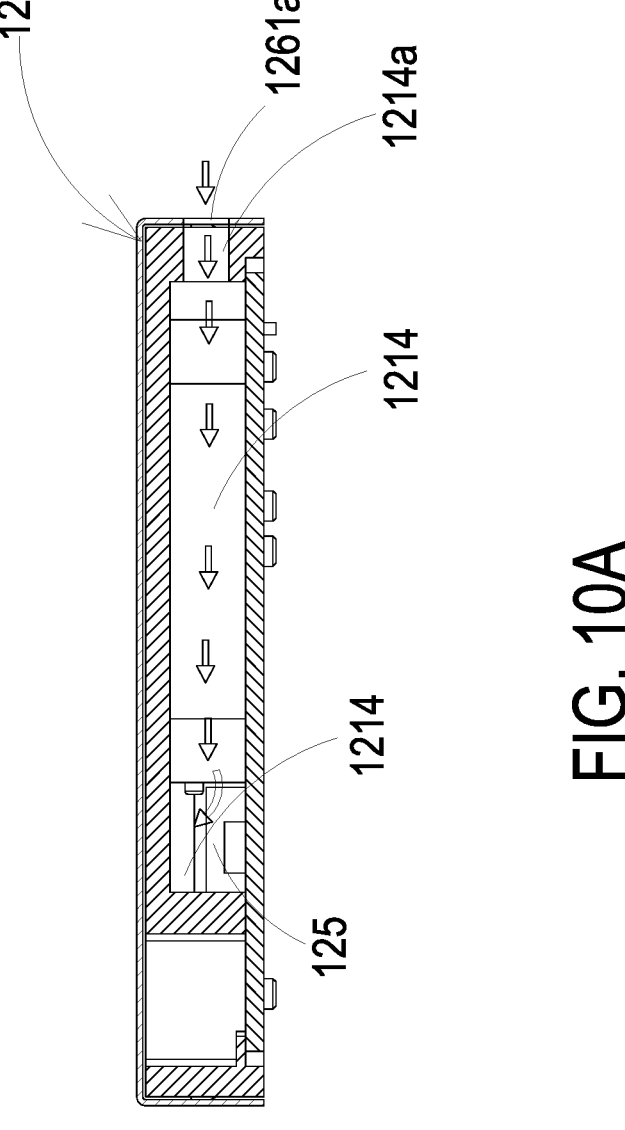
FIG. 10A is a schematic cross-sectional view illustrating the gas of the gas detection main part entering through the inlet opening of the outer cover for the method of notifying in-car air pollution according to the embodiment of the present disclosure.
Figure 10B:
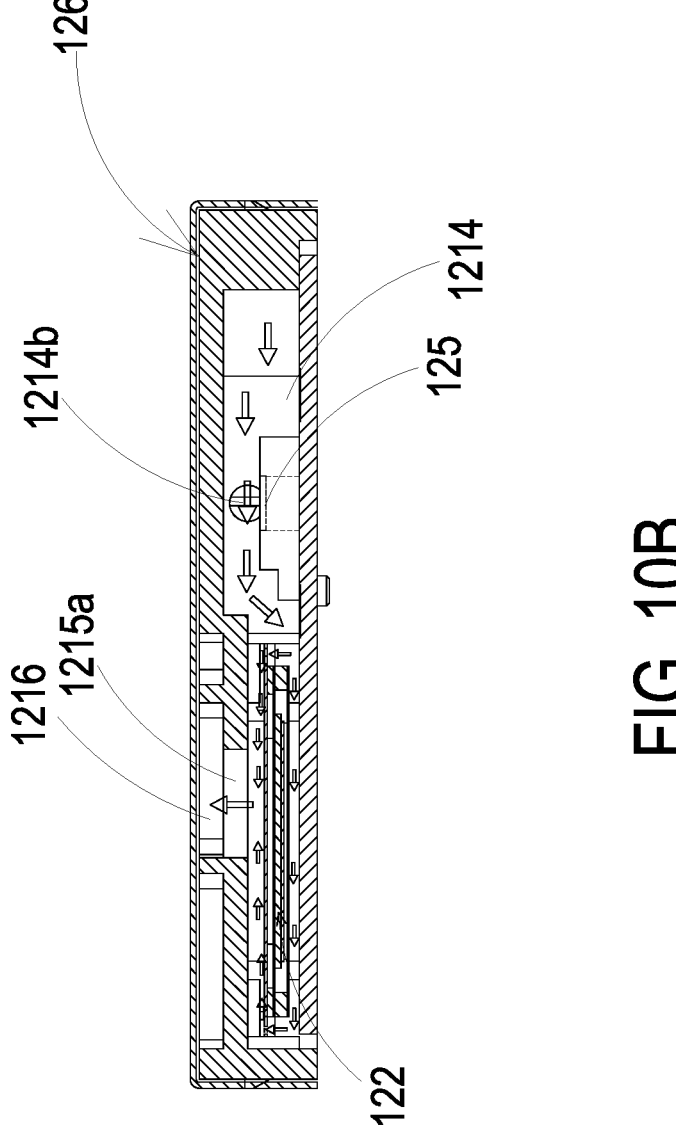
FIG. 10B is a schematic cross-sectional view illustrating the light beam emitted by the laser component of the gas detection main part emitting a light beam to pass through the transparent window and be irradiated into the gas-inlet groove for the method of notifying in-car air pollution according to the embodiment of the present disclosure.
Figure 10C:
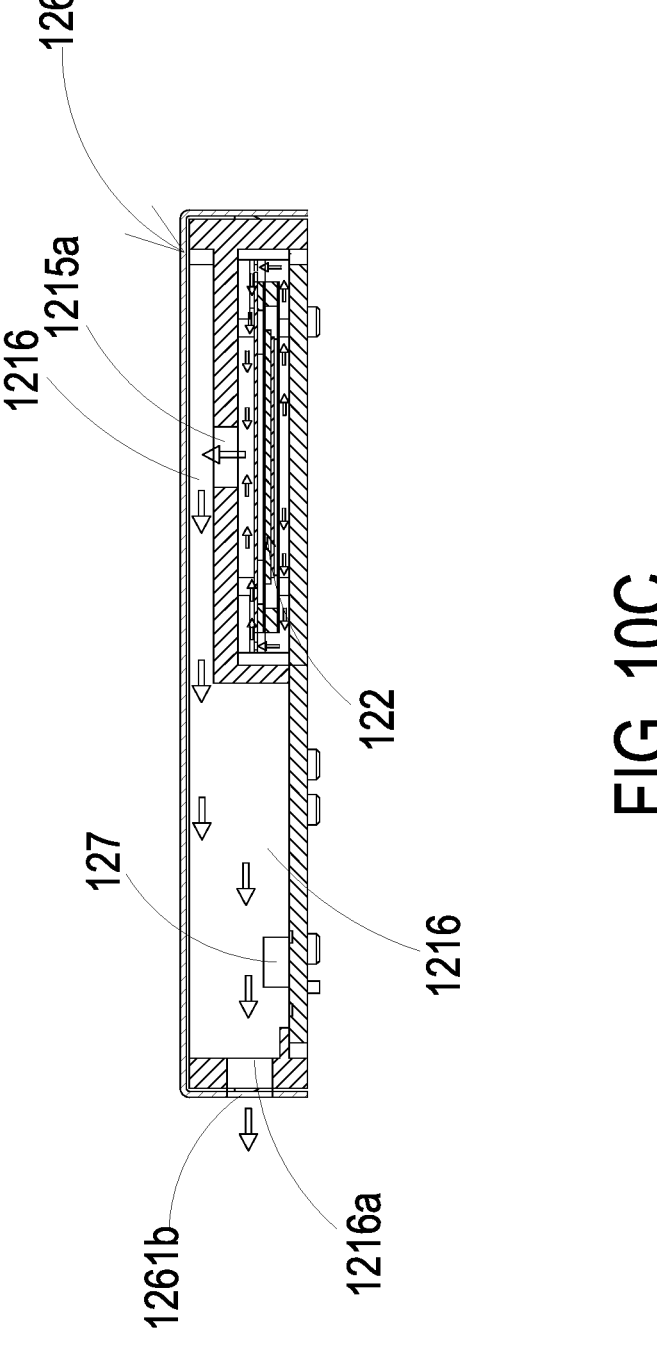
FIG. 10C is a schematic cross-sectional view illustrating the gas in the gas-outlet groove of the gas detection main part being pushed to flow through the gas outlet and the outlet opening and discharged out for the method of notifying in-car air pollution according to the embodiment of the present disclosure.

Please refer to FIG. 10A to FIG. 10C. The gas is inhaled through the gas-inlet 1214*a* on the outer cover 126, flows into the gas-inlet groove 1214 of the base 121 through the gas-inlet 1214*a*, and is transported to the position of the particulate sensor 125. The piezoelectric actuator 122 is enabled continuously to inhale the gas into the inlet path, and facilitate the gas outside the gas detection module to be introduced rapidly, flow stably, and transported above the particulate sensor 125. At this time, a projecting light beam emitted from the laser component 124 passes through transparent window 1214*b* to irritate the suspended particles contained in the gas flowing above the particulate sensor 125 in the gas-inlet groove 1214. When the suspended particles contained in the gas are irradiated and generate scattered light spots, the scattered light spots are received and calculated by the particulate sensor 125 for obtaining related information about the sizes and the concentration of the suspended particles contained in the gas. Moreover, the gas above the particulate sensor 125 is continuously driven and transported by the piezoelectric actuator 122, flows into the ventilation hole 1215*a* of the gas-guiding-component loading region 1215, and is transported to the gas-outlet groove 1216. At last, after the gas flows into the gas outlet groove 1216, the gas is continuously transported into the gas-outlet groove 1216 by the piezoelectric actuator 122, and thus the gas in the gas-outlet groove 1216 is pushed to discharge through the gas-outlet 1216*a* and the outlet opening 1261*b*.

In summary, the present disclosure provides a method of notifying in-car air pollution, which allows to detect the current air quality in the interior space of a car, enable the filtrating and purification component to filter the pollution source, and determine whether to introduce the external air into the interior space of the car automatically with the artificial intelligence. The people in the car are allowed to appreciate the current air quality through the audio and video effect immediately, and the in-car air quality can also be improved in real-time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of notifying in-car air pollution comprising:

a) providing an in-car air pollution detection system comprising a plurality of in-car gas detection modules for detecting an air pollution source in an interior space of a car and transmitting an in-car gas detection datum, at least one out-car gas detection module for detecting another air pollution source in an exterior space outside the car and transmitting an out-car gas detection datum, an in-car air conditioner and a plurality of filtering and purification components, wherein the in-car air conditioner comprises an audio element, a ventilation channel, a control drive unit, an intake-control element and a display element, the ventilation channel comprises at least one air outlet, an external-gas inlet and an in-car circulation channel, and the plurality of filtering and purification components are disposed in the ventilation channel for filtering and purifying the air pollution source in the interior space of the car, wherein the plurality of in-car gas detection modules are disposed in the interior space of the car and the ventilation channel, wherein two of the plurality of the in-car gas detection modules are disposed on an upstream and a downstream of the filtering and purification component, respectively;

b) notifying an initial value of the in-car gas detection datum, wherein when the car is started and the in-care air pollution detection system is driven, the initial value of the in-car gas detection datum is detected by the plurality of in-car gas detection modules and transmitted to the in-car air conditioner, and the initial value of the in-car gas detection datum is broadcasted by the audio element and/or displayed by the display element of the in-car air conditioner for notification;

c) notifying a post-purification value of the in-car gas detection datum, wherein the in-car gas detection datum is continuously detected and transmitted to the in-car air conditioner by the plurality of in-car gas detection modules after the air pollution source in the interior space of the car is purified and filtered by the plurality of the filtering and purification components, and the post-purification value of the in-car gas detection datum is broadcasted by the audio element and/or displayed by the display element of the in-car air conditioner for notification, wherein the control drive unit compares the in-car gas detection datum detected by the two of the plurality of the in-car gas detection modules disposed on the upstream and the downstream of the filtering and purification component, whereby the in-car gas detection datum before and after a filtration procedure of the filtering and purification component are obtained, wherein if the gas detection datum before and after the filtration procedure of the filtering and purification component is better than a safe detection value, the plurality of filtering and purification components in the car are allow to be suspended; and d) intelligently selecting to introduce or not to introduce an external gas into the interior space of the car, wherein the in-car gas detection datum and the out-car gas detection datum are received and compared under the calculation of artificial intelligence by the control drive unit of the in-car air conditioner so as to intelligently select and control the intake-control element to introduce or not to introduce the external gas in the exterior space outside the car into the interior space of the car, wherein when the external gas is inhaled into the interior space of the car, the external gas is inhaled through the external-gas inlet controlled by the intake-control element into the ventilation channel, purified by the plurality of filtering and purification components and then introduced into the interior space of the car through the air outlet, wherein when the external gas is not inhaled into the interior space of the car, the intake-control element controls a gas in the interior space of the car to be introduced from the in-car circulation channel, purified by the plurality of filtering and purification components and then expelled back into the interior space of the car through the air outlet, and the information of introducing or not introducing the external gas into the interior space of the car is broadcasted by the audio element and/or displayed by the display element of the in-car air conditioner for notification.

2. The method of notifying in-car air pollution according to claim 1, wherein the air pollution source is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof.

3. The method of notifying in-car air pollution according to claim 1, wherein when the in-car air pollution detection system is operated continuously for a predetermined time to obtain a current value of the in-car gas detection datum, the current value of the in-car gas detection datum is detected and transmitted by the plurality of in-car gas detection modules.

4. The method of notifying in-car air pollution according to claim 1, wherein when the in-car air pollution detection system is operated continuously for a predetermined time of 5 minutes to obtain a current value of the in-car gas detection datum, the current value of the in-car gas detection datum is detected and transmitted by the plurality of in-car gas detection modules.

5. The method of notifying in-car air pollution according to claim 1, wherein the plurality of filtering and purification components are disposed in a ventilation channel of the in-car air conditioner for filtering and purifying the air pollution source.

6. The method of notifying in-car air pollution according to claim 1, wherein the filtering and purification component is one selected from the group consisting of an activated carbon, a high efficiency particulate air (HEPA) filter screen and a zeolite screen.

7. The method of notifying in-car air pollution according to claim 1, wherein the filtering and purification component comprises a high efficiency particulate air (HEPA) filter screen coated with at least one selected from the group consisting of a cleansing factor containing chlorine dioxide layer, an herbal protective layer extracted from ginkgo and Japanese *Rhus chinensis* to form an herbal protective anti-allergic filter, a silver ion and the combination thereof.

8. The method of notifying in-car air pollution according to claim 1, wherein the filtering and purification component is at least one selected from the group consisting of an activated carbon, a high efficiency particulate air (HEPA) filter screen and a zeolite screen, which is combined with at least one selected from the group consisting of a photo-catalyst unit, a photo-plasma unit, a negative ionizer, a plasma ion unit and the combination thereof.

9. The method of notifying in-car air pollution according to claim 1, wherein each of the plurality of in-car gas detection modules and the at least one out-car gas detection module comprises a controlling circuit board, a gas detection main part, a microprocessor and a communicator, and the gas detection main part, the microprocessor and the communicator are integrally packaged on the controlling circuit board and electrically connected to the controlling circuit board, wherein the microprocessor controls the operations of detection of the gas detection main part, the gas detection main part detects the air pollution source and outputs a detection signal, the microprocessor receives the detection signal for calculating, processing and outputting, so that the respective microprocessor in the in-car gas detection modules and the out-car gas detection module generates the in-car gas detection datum and the out-car gas detection datum, so as to provide to the respective communicator for external communication transmission.

10. A method of notifying in-car air pollution comprising:
a) providing an in-car air pollution detection system comprising a plurality of in-car gas detection modules for detecting an air pollution source in a car and transmitting an in-car gas detection datum, at least one out-car gas detection module for detecting another air pollution source outside the car and transmitting an out-car gas detection datum, an in-car air conditioner, a plurality of filtering and purification components, and a connection device for receiving the in-car gas detection datum and the out-car gas detection datum, wherein the in-car air conditioner comprises an audio element, a ventilation channel, a control drive unit, an intake-control element and a display element, the ventilation channel comprises at least one air outlet, an external-gas inlet and an in-car circulation channel, and the plurality of filtering and purification components are disposed in an interior space of the car for filtering and purifying the air pollution source in the ventilation channel, and the plurality of in-car gas detection modules are disposed in the interior space of the car and the ventilation channel, wherein two of the plurality of the in-car gas detection modules are disposed on an upstream and a downstream of the filtering and purification component, respectively;
b) notifying an initial value of the in-car gas detection datum, wherein when the car is started and the in-car air pollution detection system is driven, the initial value of the in-car gas detection datum is detected by the plurality of in-car gas detection modules and transmitted to the connection device, the connection device transmits the initial value of the in-car gas detection datum to the in-car air conditioner, and the initial value of the in-car gas detection datum is broadcasted by the audio element and/or displayed by the display element of the in-car air conditioner for notification;
c) notifying a post-purification value of the in-car gas detection datum, wherein the in-car gas detection datum is continuously detected and transmitted to the connection device by the plurality of in-car gas detection modules after the air pollution source in the interior space of the car is purified and filtered by the plurality of the filtering and purification components, the post-purification value of the in-car gas detection datum is transmitted to the connection device by the plurality of in-car gas detection modules, the connection device transmits the post-purification value of the in-car gas detection datum to the in-car air conditioner, and the post-purification value of the in-car gas detection datum is broadcasted by the audio element and/or displayed by the display element of the in-car air conditioner for notification, wherein the connection device compares the in-car gas detection datum detected by the two of the plurality of the in-car gas detection modules disposed on the upstream and the downstream of the filtering and purification component, whereby the in-car gas detection datum before and after a filtration procedure of the filtering and purification component are obtained, wherein if the gas detection datum before and after the filtration procedure of the filtering and purification component is better than a safe detection value, the plurality of filtering and purification components in the car are allow to be suspended; and
d) intelligently selecting to introduce or not to introduce an external gas into the interior space of the car, wherein the in-car gas detection datum and the out-car gas detection datum are received and compared under the calculation of artificial intelligence by the control drive unit of the connection device, the connection device transmits instructions and controls the in-car air conditioner so as to intelligently select and control the intake-control element to control the external gas in the exterior space outside the car to be introduced into the interior space of the car or not to be introduced into the interior space of the car, wherein when the external gas is inhaled into the interior space of the car, the external gas is inhaled through the external-gas inlet controlled by the intake-control element into the ventilation channel, purified by the plurality of filtering and purification components and then introduced into the interior space of the car through the air outlet, wherein when the external gas is not inhaled into the interior space of the car, the intake-control element controls a gas in the interior space of the car to be introduced from the in-car circulation channel, purified by the plurality of filtering and purification components and then expelled back into the interior space of the car through the air outlet, and the information of introducing or not introducing the external gas into the interior space of the car is broadcasted by the audio element and/or displayed by the display element of the in-car air conditioner for notification.

11. The method of notifying in-car air pollution according to claim 10, wherein the connection device is a mobile phone device or a wearable device, and the transmission connection between the connection device and the in-car air conditioner is through wireless communication transmission.

12. The method of notifying in-car air pollution according to claim 10, wherein the air pollution source is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof.

13. The method of notifying in-car air pollution according to claim 10, wherein when the in-car air pollution detection system is operated continuously for a predetermined time to obtain a current value of the in-car gas detection datum, the current value of the in-car gas detection datum is detected and transmitted by the plurality of in-car gas detection modules.

14. The method of notifying in-car air pollution according to claim 10, wherein when the in-car air pollution detection system is operated continuously for a predetermined time of 5 minutes to obtain a current value of the in-car gas detection datum, the current value of the in-car gas detection datum is detected and transmitted by the plurality of in-car gas detection modules.

15. The method of notifying in-car air pollution according to claim 10, wherein the plurality of filtering and purification components are disposed in a ventilation channel of the in-car air conditioner for filtering and purifying the air pollution source.

16. The method of notifying in-car air pollution according to claim 10, wherein the filtering and purification component is one selected from the group consisting of an activated carbon, a high efficiency particulate air (HEPA) filter screen and a zeolite screen.

17. The method of notifying in-car air pollution according to claim 10 wherein the filtering and purification component comprises a high efficiency particulate air (HEPA) filter screen coated with at least one selected from the group consisting of a cleansing factor containing chlorine dioxide layer, an herbal protective layer extracted from ginkgo and Japanese *Rhus chinensis* to form an herbal protective anti-allergic filter, a silver ion and the combination thereof.

18. The method of notifying in-car air pollution according to claim 10, wherein the filtering and purification component is at least one selected from the group consisting of an activated carbon, a high efficiency particulate air (HEPA) filter screen and a zeolite screen, which is combined with at least one selected from the group consisting of a photo-catalyst unit, a photo-plasma unit, a negative ionizer, a plasma ion unit and the combination thereof.

19. The method of notifying in-car air pollution according to claim 10, wherein each of the plurality of in-car gas detection modules and the at least one out-car gas detection module comprises a controlling circuit board, a gas detection main part, a microprocessor and a communicator, and the gas detection main part, the microprocessor and the communicator are integrally packaged on the controlling circuit board and electrically connected to the controlling circuit board, wherein the microprocessor controls the operations of detection of the gas detection main part, the gas detection main part detects the air pollution source and outputs a detection signal, the microprocessor receives the detection signal for calculating, processing and outputting, so that the respective microprocessor in the in-car gas detection modules and the out-car gas detection module generates the in-car gas detection datum and the out-car gas detection datum, so as to provide to the respective communicator for external communication transmission.

20. A method of notifying in-car air pollution comprising:
a) providing an in-car air pollution detection system comprising a plurality of in-car gas detection modules for detecting an air pollution source in an interior space of a car and transmitting an in-car gas detection datum, at least one out-car gas detection module for detecting another air pollution source in an exterior space outside the car and transmitting an out-car gas detection datum, an in-car air conditioner, a plurality of filtering and purification components, and a connection device for receiving the in-car gas detection datum and the out-car gas detection datum, wherein the connection device comprises an audio element and a display element, the in-car air conditioner comprises a ventilation channel, a control drive unit and an intake-control element, the ventilation channel comprises at least one air outlet, an external-gas inlet and an in-car circulation channel, the plurality of filtering and purification components are disposed in the ventilation channel for filtering and purifying the air pollution source in the interior space of the car, and the plurality of in-car gas detection modules are disposed in the interior space of the car and the ventilation channel, wherein two of the plurality of the in-car gas detection modules are disposed on an upstream and a downstream of the filtering and purification component, respectively;
b) notifying an initial value of the in-car gas detection datum, wherein when the car is started and the in-car air pollution detection system is driven, the initial value of the in-car gas detection datum is detected by the plurality of in-car gas detection modules and transmitted to the connection device, and the initial value of the in-car gas detection datum is broadcasted by the audio element and/or displayed by the display element of the connection device for notification;
c) notifying a post-purification value of the in-car gas detection datum, wherein the in-car gas detection datum is continuously detected and transmitted to the connection device by the plurality of in-car gas detection modules after the air pollution source in the interior space of the car is purified and filtered by the plurality of the filtering and purification components, the post-purification value of the in-car gas detection datum is transmitted to the connection device by the plurality of in-car gas detection modules, and the post-purification value of the in-car gas detection datum is broadcasted by the audio element and/or displayed by the display element of the connection device for notification, wherein the connection device compares the in-car gas detection datum detected by the two of the plurality of the in-car gas detection modules disposed on the upstream and the downstream of the filtering and purification component, whereby the in-car gas detection datum before and after a filtration procedure of the filtering and purification component are obtained, wherein if the gas detection datum before and after the filtration procedure of the filtering and purification component is better than a safe detection value, the plurality of filtering and purification components in the car are allow to be suspended; and
d) intelligently selecting to introduce or not to introduce an external gas into the interior space of the car, wherein the in-car gas detection datum and the out-car gas detection datum are received and compared under the calculation of artificial intelligence by the control drive unit of the connection device, the connection device transmits instructions and controls the in-car air conditioner so as to intelligently select and control the intake-control element to control the external gas in the exterior space outside the car to be introduced into the interior space of the car or not to be introduced into the interior space of the car, wherein when the external gas is inhaled into the interior space of the car, the external gas is inhaled through the external-gas inlet controlled by the intake-control element into the ventilation channel, purified by the plurality of filtering and purification components and then introduced into the interior space of the car through the air outlet, wherein when the external gas is not inhaled into the interior space of the car, the intake-control element controls a gas in the interior space of the car to be introduced from the in-car circulation channel, purified by the plurality of filtering and purification components and then expelled back into the interior space of the car through the air outlet, and the information of introducing or not introducing the external gas into the interior space of the car is broadcasted by the audio element and/or displayed by the display element of the connection device for notification.

21. The method of notifying in-car air pollution according to claim 20, wherein the connection device is a mobile phone device or a wearable device, and the transmission connection between the connection device and the in-car air conditioner is through wireless communication transmission.

22. The method of notifying in-car air pollution according to claim 20, wherein the air pollution source is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof.

23. The method of notifying in-car air pollution according to claim 20, wherein when the in-car air pollution detection system is operated continuously for a predetermined time to obtain a current value of the in-car gas detection datum, the current value of the in-car gas detection datum is detected and transmitted by the plurality of in-car gas detection modules.

24. The method of notifying in-car air pollution according to claim 20, wherein when the in-car air pollution detection system is operated continuously for a predetermined time of 5 minutes to obtain a current value of the in-car gas detection datum, the current value of the in-car gas detection datum is detected and transmitted by the plurality of in-car gas detection modules.

25. The method of notifying in-car air pollution according to claim 20, wherein the plurality of filtering and purification components are disposed in a ventilation channel of the in-car air conditioner for filtering and purifying the air pollution source.

26. The method of notifying in-car air pollution according to claim 20, wherein the filtering and purification component is one selected from the group consisting of an activated carbon, a high efficiency particulate air (HEPA) filter screen and a zeolite screen.

27. The method of notifying in-car air pollution according to claim 20, wherein the filtering and purification component comprises a high efficiency particulate air (HEPA) filter screen coated with at least one selected from the group consisting of a cleansing factor containing chlorine dioxide layer, an herbal protective layer extracted from ginkgo and Japanese *Rhus chinensis* to form an herbal protective anti-allergic filter, a silver ion and the combination thereof.

28. The method of notifying in-car air pollution according to claim 20, wherein the filtering and purification component is at least one selected from the group consisting of an activated carbon, a high efficiency particulate air (HEPA) filter screen and a zeolite screen, which is combined with at least one selected from the group consisting of a photo-catalyst unit, a photo-plasma unit, a negative ionizer, a plasma ion unit and the combination thereof.

29. The method of notifying in-car air pollution according to claim 20, wherein each of the plurality of in-car gas detection modules and the at least one out-car gas detection module comprises a controlling circuit board, a gas detection main part, a microprocessor and a communicator, and the gas detection main part, the microprocessor and the communicator are integrally packaged on the controlling circuit board and electrically connected to the controlling circuit board, wherein the microprocessor controls the operations of detection of the gas detection main part, the gas detection main part detects the air pollution source and outputs a detection signal, the microprocessor receives the detection signal for calculating, processing and outputting, so that the respective microprocessor in the in-car gas detection modules and the out-car gas detection module generates the in-car gas detection datum and the out-car gas detection datum, so as to provide to the respective communicator for external communication transmission.

* * * * *